(12) United States Patent
Williamson et al.

(10) Patent No.: US 11,466,800 B2
(45) Date of Patent: Oct. 11, 2022

(54) TUBULAR COUPLING

(71) Applicant: Certus Energy Solutions, LLC, Houston, TX (US)

(72) Inventors: Patrick Williamson, Houston, TX (US); Michael G. Gay, Houston, TX (US)

(73) Assignee: CERTUS ENERGY SOLUTIONS, LLC, Houston, TX (US)

( * ) Notice: Subject to any disclaimer, the term of this patent is extended or adjusted under 35 U.S.C. 154(b) by 779 days.

(21) Appl. No.: 16/136,980

(22) Filed: Sep. 20, 2018

(65) Prior Publication Data

US 2019/0017634 A1    Jan. 17, 2019

Related U.S. Application Data

(63) Continuation-in-part of application No. 15/978,779, filed on May 14, 2018, now Pat. No. 11,028,948, (Continued)

(51) Int. Cl.
*B21H 3/08* (2006.01)
*F16L 15/06* (2006.01)
(Continued)

(52) U.S. Cl.
CPC .............. *F16L 15/06* (2013.01); *B21C 37/28* (2013.01); *B21H 3/08* (2013.01); *E21B 17/042* (2013.01)

(58) Field of Classification Search
CPC ... B21H 3/08; B21H 3/10; B21K 1/14; B21K 1/16; B21K 1/56; B23G 1/22; B23G 1/53; B23G 9/009; B23G 2210/04
(Continued)

(56) References Cited

U.S. PATENT DOCUMENTS 1,849,066 A    3/1932 Bridges
2,150,221 A    3/1939 Hinderliter
(Continued)

FOREIGN PATENT DOCUMENTS

CA    983471 A1    2/1976
CA    1203267 A1    4/1986
(Continued)

OTHER PUBLICATIONS

Non-Final Office Action dated Oct. 28, 2020, U.S. Appl. No. 15/978,779, 13 pages.
(Continued)

*Primary Examiner* — Debra M Sullivan
(74) *Attorney, Agent, or Firm* — MH2 Technology Law Group LLP

(57) ABSTRACT

A tubular connection, method for connecting tubulars, and a coupler for connecting together tubulars, of which the tubular connection includes an inner body including a bore, external threads, a tapered torque nose, and a radially-facing sealing surface. The connection also includes an outer body including a bore in communication with the bore of the inner body, internal threads configured to engage the external threads of the inner body, a tapered torque-stop surface that engages the tapered torque nose, and a radially-facing sealing surface that forms a seal with the radially-facing sealing surface of the inner body. The external threads, the internal threads, or both include at least one kick-out feature including at least one rounded or chamfered corner thereof.

14 Claims, 15 Drawing Sheets

Related U.S. Application Data which is a continuation-in-part of application No. 15/599,691, filed on May 19, 2017, now Pat. No. 9,970,576, which is a continuation of application No. 15/254,793, filed on Sep. 1, 2016, now Pat. No. 9,683,684.

(60) Provisional application No. 62/562,071, filed on Sep. 22, 2017, provisional application No. 62/381,468, filed on Aug. 30, 2016, provisional application No. 62/265,222, filed on Dec. 9, 2015.

(51) Int. Cl.
  *E21B 17/042* (2006.01)
  *B21C 37/28* (2006.01)

(58) Field of Classification Search
  USPC .................................................. 470/29, 25
  See application file for complete search history.

(56) References Cited

U.S. PATENT DOCUMENTS

| | | | |
|---|---|---|---|
| 2,206,166 | A | 7/1940 | Dunn |
| 2,885,225 | A | 5/1959 | Rollins |
| 3,224,799 | A | 12/1965 | Blose et al. |
| 3,923,324 | A | 12/1975 | Cruickshank et al. |
| 4,458,925 | A | 7/1984 | Raulins et al. |
| 4,508,375 | A | 4/1985 | Patterson |
| 4,537,429 | A | 8/1985 | Landriault |
| 4,570,982 | A | 2/1986 | Blose et al. |
| 4,577,895 | A | 3/1986 | Castille |
| 4,629,224 | A | 12/1986 | Landriault |
| 4,662,659 | A | 5/1987 | Blose et al. |
| 4,707,001 | A | 11/1987 | Johnson |
| 4,828,295 | A | 5/1989 | Plaquin |
| 4,875,713 | A | 10/1989 | Carstensen |
| 4,984,829 | A | 1/1991 | Saigo et al. |
| 4,988,127 | A | 1/1991 | Carstensen |
| 5,169,183 | A | 12/1992 | Hallez |
| 5,419,595 | A | 5/1995 | Yamamoto et al. |
| 5,505,502 | A | 4/1996 | Smith et al. |
| 5,687,999 | A | 11/1997 | Lancry et al. |
| 5,908,212 | A | 6/1999 | Smith et al. |
| 5,931,511 | A | 8/1999 | Delange et al. |
| 6,045,165 | A | 4/2000 | Sugino et al. |
| 6,047,997 | A | 4/2000 | Olivier |
| 6,174,000 | B1 | 1/2001 | Nishi |
| 6,254,146 | B1 | 7/2001 | Church |
| 6,322,110 | B1 | 11/2001 | Banker et al. |
| 6,409,175 | B1 | 6/2002 | Evans et al. |
| 6,478,344 | B2 | 11/2002 | Pallini, Jr. et al. |
| 6,481,760 | B1 | 11/2002 | Noel |
| 6,485,063 | B1 | 11/2002 | Huey |
| 6,626,471 | B2 | 9/2003 | Mallis |
| 6,729,658 | B2 | 5/2004 | Verdillon |
| 6,764,108 | B2 | 7/2004 | Ernst |
| 6,767,035 | B2 | 7/2004 | Hashem |
| 6,848,724 | B2 | 2/2005 | Kessler |
| 6,877,202 | B2 | 4/2005 | Maeda |
| 7,210,710 | B2 | 5/2007 | Williamson et al. |
| 7,464,449 | B2 | 12/2008 | Santi et al. |
| 7,494,159 | B2 | 2/2009 | Sugino et al. |
| 7,527,304 | B2 | 5/2009 | Mallis et al. |
| 7,585,002 | B2 | 9/2009 | Curley et al. |
| 7,614,667 | B2 | 11/2009 | Hignett |
| 7,765,904 | B2 | 8/2010 | Tejeda |
| 7,823,931 | B2 | 11/2010 | Hamamoto |
| 7,900,975 | B2 | 3/2011 | Nakamura et al. |
| 7,931,311 | B2 | 4/2011 | Dubedout et al. |
| 8,029,025 | B1 | 10/2011 | Sivley et al. |
| 8,136,846 | B2 | 3/2012 | Church |
| 8,220,844 | B2 | 7/2012 | Gillot et al. |
| 8,333,409 | B2 | 12/2012 | Santi et al. |
| 8,668,232 | B2 | 3/2014 | Mazzaferro et al. |
| 8,673,828 | B2 | 3/2014 | Pinel et al. |
| 8,840,151 | B2 | 9/2014 | Hignett et al. |
| 8,919,824 | B2 | 12/2014 | Back |
| 8,973,953 | B2 | 3/2015 | Hignett et al. |
| 8,991,875 | B2 | 3/2015 | Yoshikawa et al. |
| 9,057,464 | B2 | 6/2015 | Li et al. |
| 9,951,569 | B2 | 4/2018 | Tejeda et al. |
| 10,024,119 | B2 | 7/2018 | Tejeda et al. |
| 10,077,603 | B2 | 9/2018 | Tejeda et al. |
| 10,107,423 | B1 | 10/2018 | Tejeda et al. |
| 10,107,424 | B1 | 10/2018 | Tejeda et al. |
| 10,655,404 | B2 | 5/2020 | Palmer |
| 2003/0038476 | A1 | 2/2003 | Galle, Jr. |
| 2003/0132633 | A1 | 7/2003 | Maeda |
| 2003/0215296 | A1* | 11/2003 | Botelle ................. B23G 9/009 408/1 R |
| 2004/0108720 | A1 | 6/2004 | Mallis |
| 2004/0118569 | A1 | 6/2004 | Brill et al. |
| 2004/0194278 | A1* | 10/2004 | Brill ..................... E21B 17/042 29/456 |
| 2005/0093250 | A1 | 5/2005 | Santi et al. |
| 2008/0296894 | A1 | 12/2008 | Bailey et al. |
| 2009/0250927 | A1 | 10/2009 | Pallini, Jr. |
| 2010/0301603 | A1 | 12/2010 | Beigneux et al. |
| 2011/0012347 | A1 | 1/2011 | Pacheco |
| 2011/0025051 | A1 | 2/2011 | Yamaguchi et al. |
| 2011/0233925 | A1 | 9/2011 | Pina et al. |
| 2011/0278838 | A1 | 11/2011 | Martin et al. |
| 2013/0069364 | A1 | 3/2013 | Martin et al. |
| 2013/0277963 | A1 | 10/2013 | Carrois et al. |
| 2014/0203556 | A1 | 7/2014 | Besse |
| 2014/0333065 | A1 | 11/2014 | Pacheco |
| 2015/0191980 | A1 | 7/2015 | Rekin et al. |
| 2018/0003212 | A1* | 1/2018 | Seo ......................... B23G 1/16 |
| 2018/0050383 | A1* | 2/2018 | Kameda .................. B21H 3/08 |

FOREIGN PATENT DOCUMENTS

| | | |
|---|---|---|
| CA | 1229862 | 12/1987 |
| CA | 1241038 | 8/1988 |
| CA | 1242474 A | 9/1988 |
| CA | 2132767 C | 6/1998 |
| CA | 2288740 | 11/1998 |
| CA | 2441816 | 9/2002 |
| CA | 2185251 C | 7/2005 |
| CA | 2354975 C | 11/2005 |
| CA | 2819998 A1 | 11/2005 |
| CA | 2289097 C | 3/2007 |
| CA | 2452756 C | 11/2007 |
| CA | 2381711 C | 7/2008 |
| CA | 2370844 C | 10/2008 |
| CA | 2744396 A1 | 5/2010 |
| CA | 2749549 | 6/2010 |
| CA | 2756220 | 9/2010 |
| CA | 2578008 C | 12/2010 |
| CA | 2678921 C | 3/2012 |
| CA | 2547853 C | 5/2012 |
| CA | 2822504 | 7/2012 |
| CA | 2827922 | 9/2012 |
| CA | 2857432 | 6/2013 |
| CA | 2703249 C | 8/2013 |
| CA | 2727745 C | 1/2014 |
| CA | 2885233 A1 | 3/2014 |
| CA | 2768455 C | 4/2014 |
| CA | 2727754 C | 6/2014 |
| CA | 2692061 C | 6/2015 |
| EP | 0150657 B1 | 7/1990 |
| GB | 465538 A | 5/1937 |

OTHER PUBLICATIONS

Jin Ho Kim (Authorized Officer), International Search Report and Written Opinion dated Mar. 20, 2017, International Application No. PCT/US2016/063860, filed Nov. 28, 2016, pp. 1-22.

\* cited by examiner

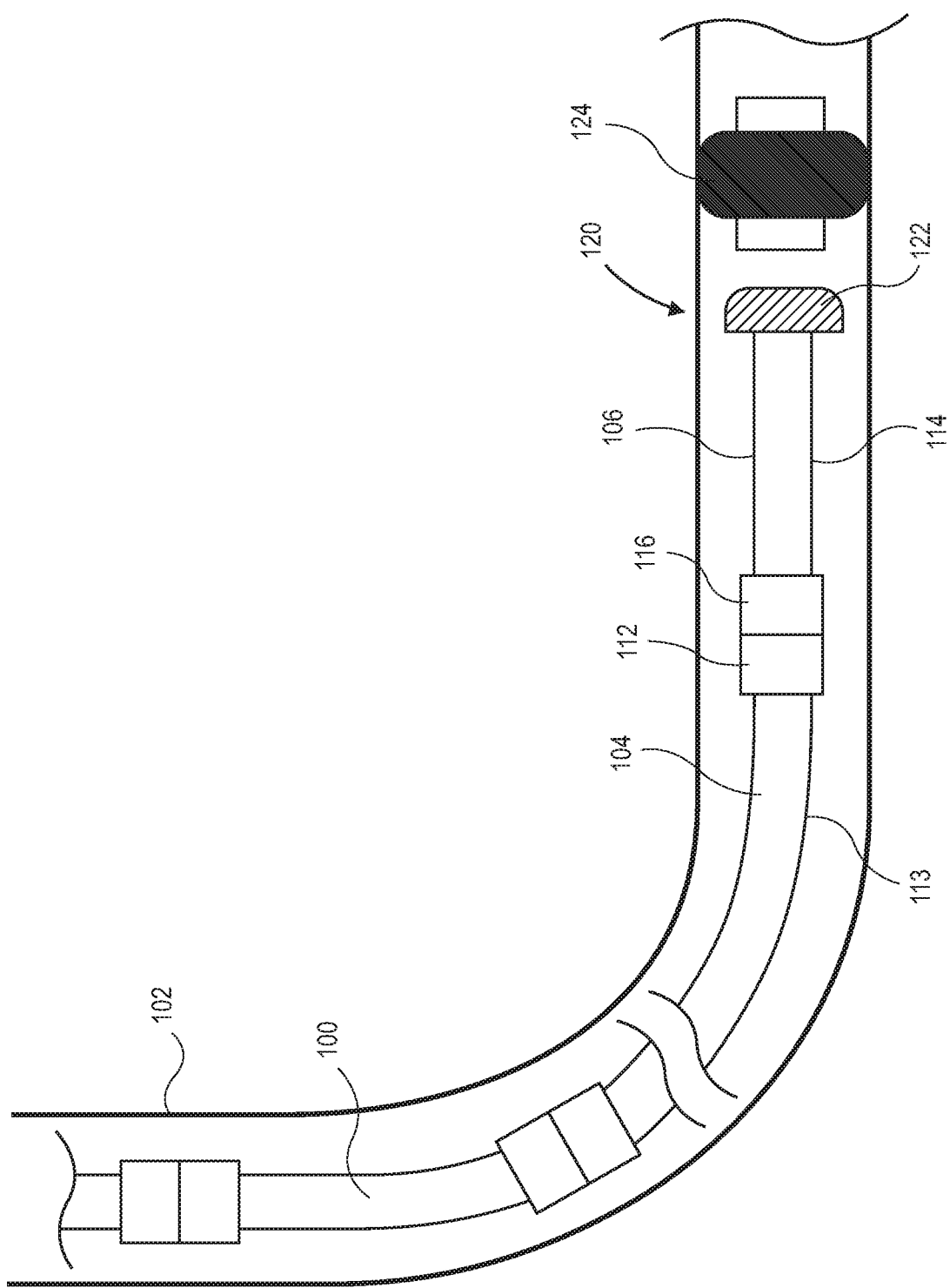

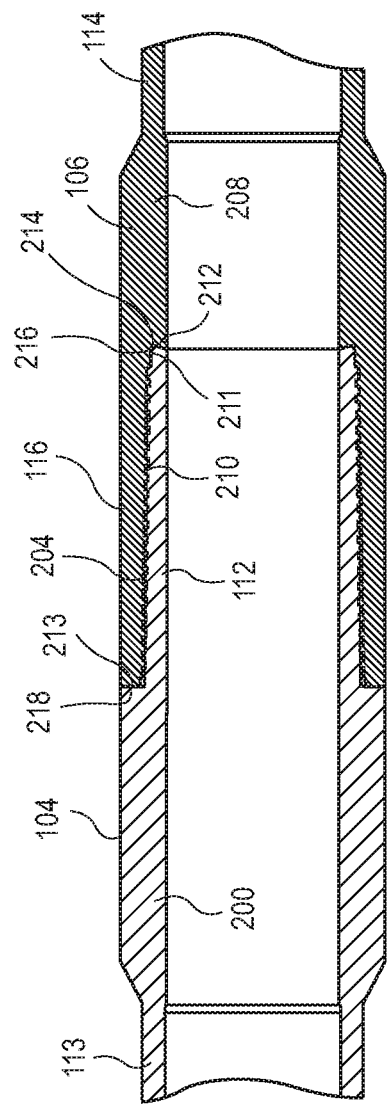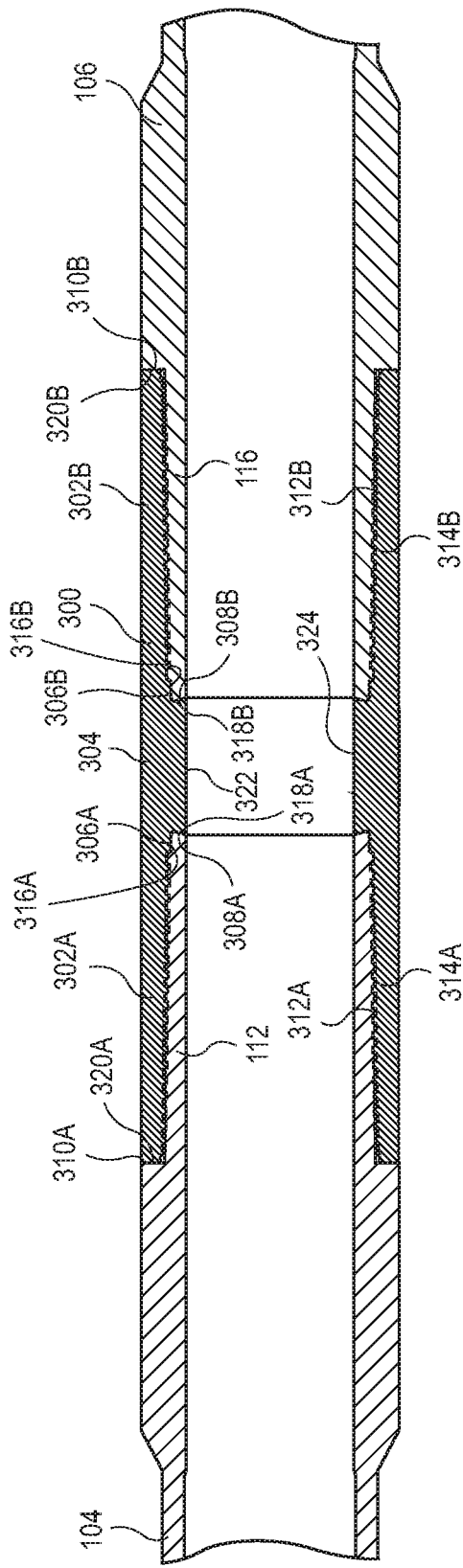

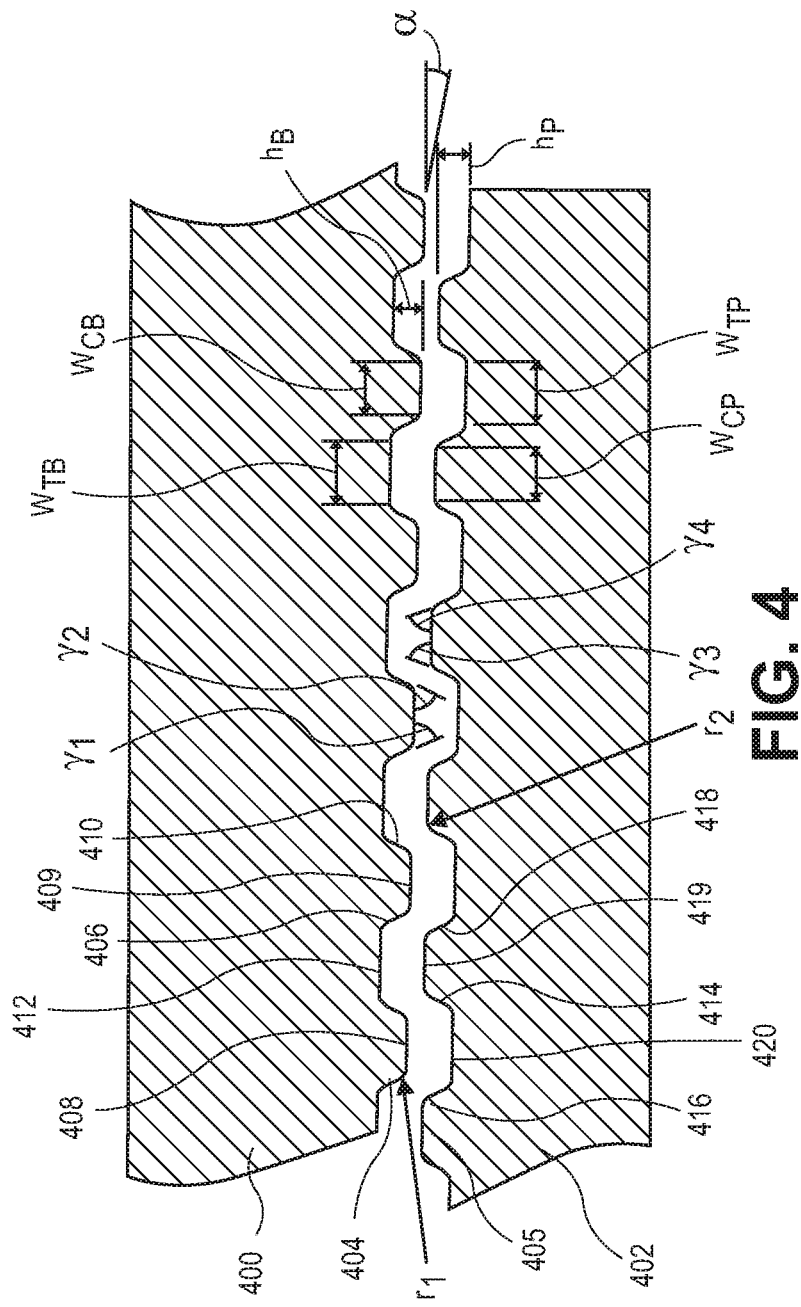

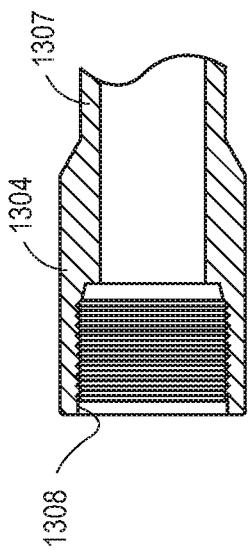
FIG. 13
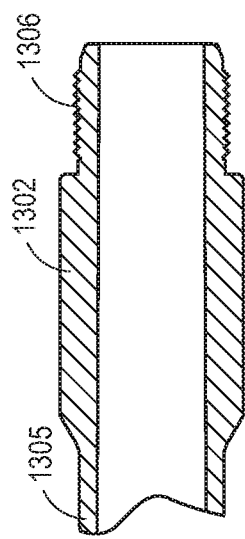
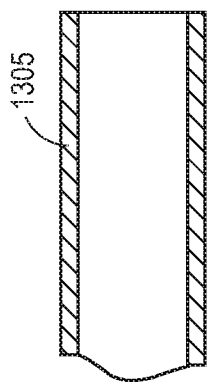
FIG. 14
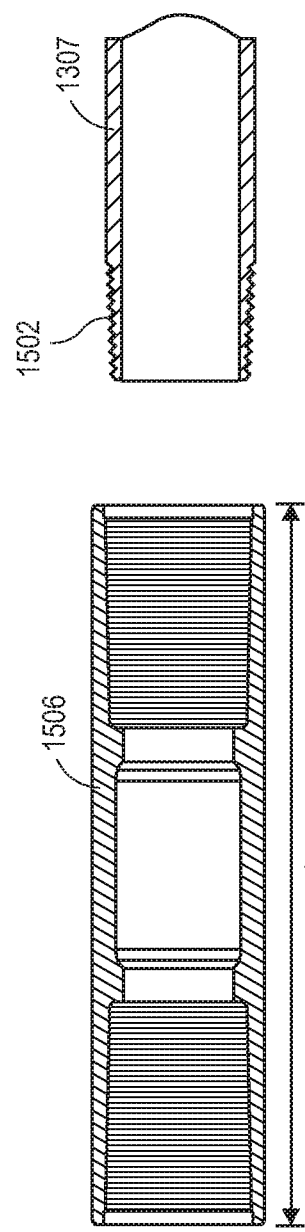
FIG. 15

TUBULAR COUPLING

CROSS-REFERENCE TO RELATED APPLICATIONS

This application claims priority to U.S. Provisional Patent Application Ser. No. 62/562,071, filed on Sep. 22, 2017. This application is also a continuation-in-part of U.S. patent application Ser. No. 15/978,779, filed on May 14, 2018, which is a continuation-in-part of U.S. patent application Ser. No. 15/599,691, filed on May 19, 2017, which is a continuation of U.S. patent application Ser. No. 15/254,793, filed on Sep. 1, 2016 (now U.S. Pat. No. 6,983,684), which claims priority to U.S. Provisional Patent Application Ser. No. 62/381,468, filed on Aug. 30, 2016, and U.S. Provisional Patent Application Ser. No. 62/265,222, filed on Dec. 9, 2015. Each of these priority applications is incorporated herein by reference in its entirety.

BACKGROUND

Tubular products ("tubulars") are used in a variety of oilfield applications in which fluids are conveyed or isolated, and are found in both surface and downhole applications. Several hundred to several thousand feet of tubulars may be employed in such applications. Tubulars generally fall into two categories: continuous and jointed. Continuous tubulars are typically flexible and may be spooled or coiled for transportation and unspooled for use. Jointed tubulars are often more rigid. Rather than spooling, these tubulars may be provided in relatively short sections or "joints" and then connected together onsite for the application. When such tubulars are connected or "made up" together, they are often referred to as a "string" of tubulars. Casing and drill pipe are two examples of jointed tubulars that may be made into such strings.

In the oilfield, tubulars may be sufficiently robust to withstand high pressure differentials across their walls. Further, the tubulars may support tensile/compressive loads and/or torsional loads. In jointed tubular strings, the connection between the tubulars thus also supports such loads. A variety of such tubular connections or "couplings" have been designed and implemented for such loads.

However, these tubular couplings often call for complex designs and expensive specialty threading. Moreover, the couplings can represent a failure point in the tubular string. Thus, when the threads of the tubular itself, or of a coupling attached thereto, wear down, the affected tubulars and/or couplings may be replaced with a new assembly, which incurs the costs associated with replacing such parts.

SUMMARY

Embodiments of the disclosure may provide a method for modifying a tubular coupling. The method includes forming new threads in the tubular coupling after the tubular coupling has been coupled to a tubular member. The tubular coupling includes a body having a bore formed axially-therethrough, internal threads formed on an inner surface of the body that were used to couple the tubular coupling to the tubular member, the new threads being a continuation of the internal threads, and a shoulder extending radially-inward from body with respect to the internal threads, wherein forming the new threads comprises removing a portion of the shoulder.

Embodiments of the disclosure may also provide a method for modifying a tubular coupling. The method includes forming new threads in the tubular coupling after the tubular coupling has been coupled to first and second tubular members. The tubular coupling includes a body having a first axial side and a second axial side, a first connector having first internal threads that are configured to couple with the first tubular member, the first connector extending from the first axial side, the first connector defining a radially-facing sealing surface, a second connector having second internal threads that are configured to couple with the second tubular member, the second connector extending from the second axial side, the second connector defining a radially-facing sealing surface, and the first and second connectors being in fluid communication with one another through the body, and a shoulder positioned axially-between the first and second connectors. Forming the new threads includes removing a portion of the shoulder. Further, the first internal threads and the new threads have a ratio of thread height to pitch of between about 0.10 and about 0.20.

Embodiments of the disclosure may also provide a tubular coupling including a body having a bore formed axially-therethrough, and internal threads formed on an inner surface of the body. The internal threads were previously used to couple the tubular coupling to a tubular member. The body may also include new threads formed on the inner surface of the body, the new threads being formed after the internal threads were previously used to couple the tubular coupling to the tubular member, the new threads being a continuation of the internal threads. The body also includes a shoulder extending radially-inward from the body with respect to the internal threads and the new threads, the new threads being positioned axially-between the internal threads and the shoulder.

The foregoing summary is intended to introduce a subset of the aspects of the present disclosure that are more fully described below. This summary is not intended to be exhaustive or to highlight key or important aspects of the disclosure, and should not be considered limiting on the scope of the following disclosure or the appended claims.

BRIEF DESCRIPTION OF THE DRAWINGS

The present disclosure may best be understood by referring to the following description and accompanying drawings that are used to illustrate embodiments of the invention. In the drawings:

FIG. 1 illustrates a schematic view of a tubular string in a wellbore, according to an embodiment.

FIG. 2 illustrates a side, cross-sectional view of a first tubular attached to a second tubular using an integral coupling, according to an embodiment.

FIG. 3 illustrates a side, cross-sectional view of a first tubular connected to a second tubular using a tubular coupling, according to an embodiment.

FIG. 4 illustrates a side, cross-sectional view of thread profiles for inner and outer bodies that are connected together, according to an embodiment.

FIG. 13 illustrates a side, cross-sectional view of a first tubular disconnected from a second tubular, according to an embodiment.

FIG. 14 illustrates a side, cross-sectional view of the first tubular and the second tubular after removing connectors thereof, according to an embodiment.

FIG. 15 illustrates a side, cross-sectional view of the first and second tubulars being connected together using a tubular coupling, according to an embodiment.

DETAILED DESCRIPTION

Figure 5A:
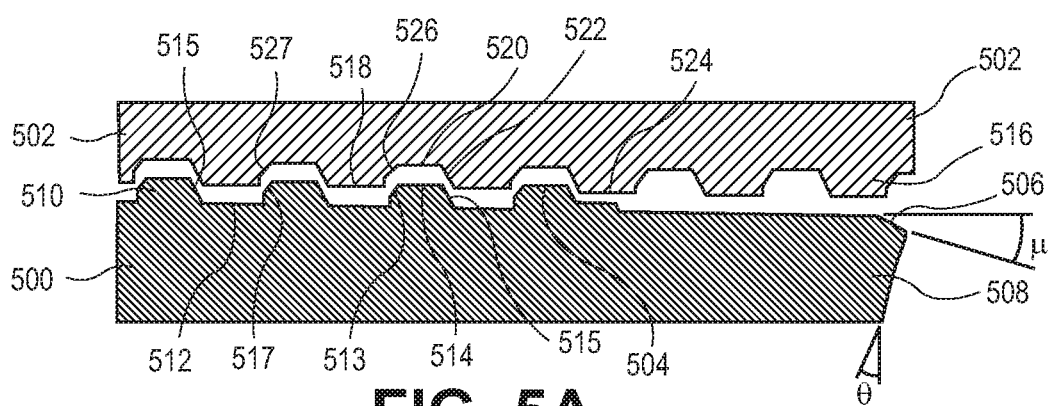
FIGS. 5A, 5B, 5C, and 5D illustrate side, cross-sectional views of thread profiles for inner and outer bodies that are connected together, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the present disclosure. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. The embodiments presented below may be combined in any way, e.g., any element from one embodiment may be used in any other embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. In the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

In this disclosure, a connection made between an inner body and an outer body is described, e.g., embodying a connection between two tubulars, whether directly together or via a tubular coupling. In some embodiments, the tubulars may initially be connected together, and it may be determined that threads of one or both tubulars, or other parts of the tubulars, are unsuitable for continued use. As such, rather than replacing the tubulars and/or couplings, the regions including the threads may be cut off or otherwise removed. New threads may then be formed on the exterior of the tubulars, and a tubular coupling may be provided to connect the tubulars together. In some embodiments, the tubular coupling may be sized to make up the difference in the lengths of the tubulars lost by cutting off the previous threaded connectors. In other embodiments, the outer body may be provided by the second tubular, such that the two tubulars are connected directly together, thereby avoiding the need for a separate coupling. In some embodiments, the second tubular may be swaged outwards to form a new box-end (female) coupling, with the threads thereof being internal and formed therein for receiving and engaging with the external, pin-end (male) threads of the first tubular. Various other aspects and embodiments will be described below with specific reference to the embodiments of the Figures. In addition, the tubular connection will be described in relation to a 2⅜-inch diameter tubing; however, it will be appreciated that the features of the tubular connection described herein may be scaled for use with a larger or a smaller diameter tubing.

Turning now to the specific, illustrated embodiments, FIG. 1 illustrates a side, schematic view of a tubular string 100 in a wellbore 102, according to an embodiment. The tubular string 100 may include a plurality of tubulars which may be connected together, end-to-end, e.g., at the surface, and run into the wellbore 102. In particular, the tubular string 100 may include a first tubular 104 and a second tubular 106. The first tubular 104 includes a tubular body 113 and a first connector 112. The first connector 112 may be externally threaded, e.g., it may be a "pin-end" connector. The connector 112, as with the other connectors referred to herein, may be integrally formed with a remainder of the first tubular 104, or may be separately formed and coupled thereto.

Similarly, the second tubular 106 includes a tubular body 114 and a second connector 116. The second connector 116 may be internally or externally threaded in various embodiments. For example, if the first and second tubulars 104, 106 are connected directly together, as shown, the second connector 116 may be an internally-threaded, "box-end" connector. As such, the second connector 116 may be configured to receive the first connector 112. By rotating one or both of the first and second tubulars 104, 106, the threads may engage and form a secure connection therebetween. In other embodiments, as will be described in greater detail below, a tubular coupling may be provided. In an embodiment, the coupling may have two internally-threaded connectors on either axial end. As such, the second connector 116 may be externally threaded, so as to connect with the internal threads of the tubular coupling. It will be appreciated that embodiments are contemplated in which the coupling has one internally-threaded end and one externally-threaded end, and the second connector 116 may be internally threaded in such embodiments. In other embodiments, the first and second connectors 112, 116 may be box-end connectors, and thus the tubular coupling may include two pin-end connectors.

The tubular string 100 may also include a downhole tool 120 for use in a wellbore operation. To name one specific example, among many contemplated, the downhole tool 120 may be or include a milling device 122 for use in a milling operation. The milling device 122 may be configured to mill out a packer 124 disposed in the wellbore 102 when the first and second tubulars 104, 106 are rotated. It will be appreciated that a variety of other downhole tools 120 may also or instead be used. During the wellbore operation, the first and second connectors 112, 116 may be scarred and/or damaged, which may result in the first and second tubulars 104, 106 failing, or a determination may be made that the first and/or second tubulars 104, 106 have reached the end of their current lifecycles and are due to be replaced or repaired.

FIG. 2 illustrates a side, cross-sectional view of the first tubular 104 connected to the second tubular 106, according to an embodiment. In this embodiment, the first connector 112 of the first tubular 104 may be received into and directly coupled to the second connector 116 of the second tubular 106. As such, this arrangement may be considered an "integral" coupling between the first and second tubulars 104, 106.

Further, the first tubular 104 includes a generally cylindrical wall 200, which may be of a generally constant diameter as proceeding along the tubular body 113, but may expand outwards proximal to the first connector 112. Such outward expansion may be accomplished by swaging or another operation. Further, the thickness of the wall 200 may be reduced at the first connector 112, as threads 204 may be cut therein. In some embodiments, the wall 200 may be tapered at the first connector 112, such that the thickness of the wall 200, as well as the outer diameter thereof, decreases as proceeding along the first connector 112, away from the tubular body 113. Such taper may provide increased tensile load capacity for the first connector 112, in comparison to non-tapered embodiments, which may lose tensile strength because of the reduced thickness of the wall 200 at the first connector 112.

The second tubular 106 may likewise include a generally cylindrical wall 208, which may be generally constant in diameter as proceeding along the tubular body 114, but may expand radially outwards proximate to the second connector 116. Such outward expansion may be accomplished by swaging or another operation. Further, the thickness and outer diameter of the wall 208 may be reduced, e.g., tapered, at the second connector 116. For example, the wall 208 may be tapered so as to receive the tapered geometry of the first connector 112, e.g., reverse or complementarily tapered. This may allow the second connector 116 to accommodate receiving the first connector 112 therein. The second connector 116 may also include internal threads 210, which may be configured to engage the threads 204 of the first connector 112.

The first connector 112 may include a shoulder 213, a radially-facing sealing surface 211, and a torque nose 212 that defines an axially-facing end of the first tubular 104. In some embodiments, the shoulder 213 and the torque nose 212 may be on opposite axial ends of the first connector 112, with the threads 204 being defined at least partially, e.g., entirely, therebetween. The sealing surface 211 may, in at least one embodiment, be positioned around an outer diameter of the wall 200, adjacent to the torque nose 212, e.g., extending axially from the torque nose 212. As the terms are used herein, "axial," "axially," and "axial direction" refer to a direction that is parallel to a central, longitudinal axis of a cylindrical body. "Radial," "radially," and "radial direction" refer to a direction perpendicular to the axial direction. "Radially-facing" means facing in the radial direction or both the axial and radial directions (e.g., oriented at an angle).

The second connector 116 may include a stop surface 214, a radially-facing sealing surface 216, and an end surface 218. The stop surface 214 may be positioned, shaped, or otherwise configured to engage the torque nose 212, as will be described in greater detail below. Accordingly, when the first and second connectors 112, 116 are connected together, the interaction between the torque nose 212 and the stop surface 214 may prevent further axial movement of the first connector 112 relative to the second connector 116. Similarly, the end surface 218 may engage the shoulder 213 when the first and second connectors 112, 116 are fully connected. The threads of the first and second connectors 112, 116 may also be configured to interfere with one another as the first and second connectors 112, 116 are advanced together.

The sealing surface 216 may form a metal-to-metal seal with the sealing surface 211 of the first connector 112. In some embodiments, the torque nose 212 and the stop surface 214 may also form a metal-to-metal seal, but in other embodiments, the torque nose 212 and the stop surface 214 may not form such a seal. For example, forces incident on the first and second tubulars 104, 106 may cause the torque nose 212 and the stop surface 214 to abrade against one another, or otherwise potentially affect the integrity of a seal formed therebetween. Forming a seal between the sealing surface 216 and the sealing surface 211 generally in the radial direction may avoid such damage and thus facilitate maintaining a sealing interface between the first and second connectors 112, 116. Further, in some embodiments, the end surface 218 may form a metal-to-metal seal with the shoulder 213, but in other embodiments, may not. In addition, the seal between the surfaces 211 and 216 may be formed solely by applying a torque to the first tubular 104, the second tubular 106, or both, e.g., without having to radially expand one or the other.

FIG. 3 illustrates a side, cross-sectional view of the first tubular 104 connected to the second tubular 106 using a tubular coupling 300, according to an embodiment. The tubular coupling 300, in this embodiment, may include two connectors 302A, 302B configured to engage the first and second connectors 112, 116 of the first and second tubulars 104, 106, respectively, and thereby couple the first and second tubulars 104, 106 together, end-to-end. In some embodiments, the two connectors 302A, 302B of the tubular coupling 300 may be internally threaded, e.g., box-end connectors. Moreover, the two connectors 302A, 302B may be formed similarly to the second connector 116 shown in and described above with reference to FIG. 2. Further, the first and second connectors 112, 116 may each be formed similarly to the first connector 112 shown in and described above with reference to FIG. 2.

Considering the tubular coupling 300 in greater detail, the tubular coupling 300 may include a body 304, in which the two connectors 302A, 302B may be defined. Thus, the body 304 may define sealing surfaces 306A, 306B, torque-stop surfaces 308A, 308B, and end surfaces 310A, 310B for the respective connectors 302A, 302B. In addition, the connectors 302A, 302B may include threads 312A, 312B formed in the body 304, which may be configured to engage threads 314A, 314B of the first and second connectors 112, 116.

The sealing surfaces 306A, 306B may be on a radially-facing surface of the connectors 302A, 302B and may be configured to engage and form a seal with radial sealing surfaces 316A, 316B of the first and second connectors 112, 116. Further, the torque-stop surfaces 308A, 308B may engage torque noses 318A, 318B, and the end surface 310A, 310B may engage shoulders 320A, 320B of the first and second connectors 112, 116, e.g., potentially forming a seal therewith.

The body 304 of the tubular coupling 300 may define a central shoulder 322 therein, which may partition the connectors 302A, 302B from one another. The central shoulder 322 may extend radially, increasing a thickness of the body 304 between the connectors 302A, 302B. For example, the central shoulder 322 may cooperate with bores of the first and second tubulars 104, 106 to provide a smooth, e.g., generally constant diameter bore 324 through the tubular coupling 300 when the first and second tubulars 104, 106 are connected thereto.

The two different types of connectors (e.g., using a tubular coupling as in FIG. 3 or integral connection as in FIG. 2) share in common the provision of at least one inner body that is externally threaded and at least one outer body that is internally threaded, with the inner and outer bodies being connected together via their threads. Thus, a variety of embodiments for such connection are described below with reference to an inner body and an outer body, with it being appreciated that each may be part of an oilfield tubular or part of a coupling.

FIG. 4 illustrates a side, cross-sectional view of a connection made between an outer body 400 and an inner body 402 using threads 404, 405, respectively, according to an embodiment. In particular, the threads 404 may be internal and may be configured to engage the external threads 405 formed in the inner body 402. The threads 404, 405 may each be formed from a single, helical ridge cut or otherwise formed in the respective body 400, 402, without departing from the scope of the term "threads," which generally refers to the multiple crests and troughs that are apparent when viewing the thread form in cross-section. Accordingly, the threads 404 may include crests 408 and troughs 412. Each crest 408 may include a stabbing flank 406, an inner surface 409, and a load flank 410. Similarly, the threads 405 may include crests 416 and troughs 420, with each crest 416 including a load flank 414, a stabbing flank 418, and an outer surface 419. When connected together, the load flanks 410, 414 may be adjacent (e.g., may contact one another) and the stabbing flanks 406, 418 may be adjacent (e.g., may contact one another, or there may be a gap formed therebetween).

A width $W_{CB}$ of the crest 408 of the threads 404 may be defined between the stabbing flank 406 and the load flank 410. A width $W_{TB}$ of the trough 412 of the threads 404 may be defined between the stabbing flank 406 and the load flank 410 of two adjacent crests 408. Similarly, a width $W_{CP}$ of the crest 416 of the threads 405 may be defined between the load flank 414 and the stabbing flank 418. A width $W_{TP}$ of the trough 420 may be defined between the stabbing flank 418 and the load flank 414 of adjacent crests 416. In an embodiment, the width $W_{CP}$ is between about 0.040 inches and about 0.136 inches, and the width $W_{CB}$ is between about 0.039 inches and about 0.132 inches.

The widths $W_{CP}$ and $W_{CB}$ of the crests 408, 416 may, in some embodiments, be equal, about equal (e.g., within a certain tolerance), or different. Similarly, the widths $W_{TP}$ and $W_{TB}$ of the troughs 412, 420 may be equal, about equal, or different. Further, the width $W_{TP}$ of the trough 412 may be larger than the width $W_{CB}$ of the crest 416, and the width $W_{TB}$ of the trough 420 may be larger than the width $W_{CP}$ of the crest 416. Accordingly, when the inner body 402 is threaded into the outer body 400, a gap may be formed between the stabbing flank 418 of the thread 405 and the stabbing flank 406 of the thread 404, while the load flank 414 may engage the load flank 410. The gap may be provided, among other things, potentially to receive and serve as a reservoir for a coating that may be applied to either or both threads 404, 405.

In some embodiments, the threads 404, 405 may be constructed to interfere and support a portion of the overall torque load, thereby reducing the loads between the torque-stop surface (e.g., 214 of FIG. 2) and the torque nose (e.g., 212 of FIG. 2). The interference may be generated in a variety of manners, such as by running the crests 408, 416 together or modifying the pitch along the length of the threads 404, 405. For example, when the crest 416 is engaged with crest 408, e.g., where the stabbing flank 406 meets the trough 412 (the "root" of the crest 408), any further engagement of the outer and inner bodies 400, 402 may urge the crest 416 into the crest 408, resulting in interference. When the geometry of the threads 404, 405 is selected such that this interference occurs when the torque nose (e.g., 212 of FIG. 2) engages the torque-stop surface (e.g., 214 of FIG. 2), a portion of the applied torque is carried at both locations (threads and torque nose/stop surface). As a result, the connection between the outer and inner bodies 400, 402 may be able to carry a higher torsional load than it is capable of carrying when just the torque nose (e.g., 212 of FIG. 2) and torque-stop surface (e.g., 214 of FIG. 2) are engaged.

The threads 404, 405 may include a kick-out feature, which may facilitate disconnection of the outer and inner bodies 400, 402. For example, after providing break-out torque to the connection, and rotating the inner and outer bodies 400, 402 relative to one another, in a direction that causes the inner body 402 to withdraw from within the outer body 400, the threads 404, 405 may become less and less engaged with the threads 405. This occurs due to the taper (as defined by a taper angle α, described below) of the connection. As the inner body 402 is backed out from the outer body 400, at some point, the threads 404 may be able to clear the threads 405, allowing for axial (linear) relative movement of the inner and outer bodies 400, 402. However, although the dimensions of the threads 404, 405 may allow for such movement, if the inner and outer bodies 400, 402 are not precisely coaxial, the threads 404, 405 may become caught on one another, preventing the linear movement. The kick-out feature may alleviate this difficulty, avoiding at least some amount of hang-up between the threads 404, 405. In addition, by provision of the kick-out feature, the torque used to disconnect the threads 404, 405 may, in some example cases, be less than the torque used to make a full connection, e.g., between about 1,000 ft-lbs and about 1,500 ft-lbs less.

In an embodiment, the kick-out feature may, for example, include rounded corners of the threads 404, e.g., between the stabbing flank 406 and the trough 412 of the thread 404, between the stabbing flank 406 and the inner surface 409, between the load flank 410 and the inner surface 409, and/or between the load flank 410 and the trough 412. In an embodiment, the corners of the threads 404 may define a radius $r_1$ of between about 0.001 inches and about 0.010 inches, for example, about 0.005 inches. It will be appreciated that, in embodiments in which multiple corners are rounded, the radii of such rounding may be the same or different as between different corners.

Similarly, the threads 405 may be rounded as part of such a kick-out feature. For example, the threads 405 may be rounded between the load flank 414 and the trough 420, between the load flank 414 and the outer surface 419, between the stabbing flank 418 and the outer surface 419, and/or between the stabbing flank 418 and the trough 420. In an embodiment, the corners of the threads 405 may define a radius $r_2$ of between about 0.010 inches and about 0.020 inches, or, for example, about 0.015 inches. It will be appreciated that, in embodiments in which multiple corners are rounded, the radii of such rounding may be the same or different as between different corners.

In addition, the rounded corners of the threads 404, 405 (e.g., defining the radii $r_1$ and $r_2$) may provide a smooth transition between surfaces of the threads 404, 405, which may limit stress risers and reduce the likelihood of mechanical damage due to contact between the threaded surfaces.

The pitch of the threads 404, 405 may vary from approximately 4 threads per inch to 10 threads per inch. For example, four threads per inch corresponds to a thread pitch value of approximately 0.25 inches; six threads per inch relates to approximately 0.167 inches; and 10 threads per inch relates to approximately 0.100 inches, etc. The form of the threads 404, 405 may thus be further described by the thread height relative to the thread pitch. In one embodiment, the thread height, that is, the radial distance from where the load flank and stabbing flank meet the trough to where the stabbing flank and load flank meet the outer or inner surface, is between about 10% and about 18% of the thread pitch, e.g., about 15% of the thread pitch. In an embodiment, the thread height may be between about 0.020 inches and 0.030 inches or between about 0.015 inches and about 0.038 inches. In an embodiment, the threads 404, 405 may be asymmetric and may have a ratio of thread height to pitch of between about 0.10 and about 0.20.

Considering the heights of the threads 404, 405 separately, the threads 404 may have a height $h_B$, and the threads 405 may have a height $h_P$. The height $h_B$ may be smaller than the height $h_P$, and thus the aforementioned gap may also extend between corresponding troughs 420 and the crests 408, while the crests 416 may engage the troughs 412. In other embodiments, the height $h_P$ may be equal to the height $h_B$, such that interference may be generated. In an embodiment, the height $h_P$ may be between about 0.016 inches and about 0.038 inches, e.g., between about 0.025 inches and about 0.029 inches, and the height $h_B$ may be between about 0.015 inches and about 0.040 inches, e.g., between about 0.016 inches and about 0.038 inches In some embodiments, the ratio of the height $h_P$ to an outer diameter of the inner body 402 (e.g., the first tubular 104 of FIG. 1) may be between about 0.0039 and about 0.0114. Further, the ratio of the height $h_B$ and an inner diameter of the outer body 400 may be between about 0.0042 and about 0.0145.

By way of explanation, a relatively short thread may be prone to "thread jumping," during which a crest received into a trough will leave the trough and enter into an adjacent trough. Thread jumping can be an elastic or plastic event, and can damage the thread form and affect the connection between the inner and outer bodies. A tapered connection may increase the axial to radial translation. In general, the taper increases the angle of the flank which increases the radial component of the load. The taper also increases the likelihood of a thread jump occurring, because the engagement of the box and pin thread forms is reduced when the pin is moved axially out of the connection. Accordingly, conventional wisdom in some circumstances may be to avoid a combination of a tapered connection with relatively short threads, such as the connection disclosed herein.

Additionally, when the threads 404, 405 are engaged in a manner that the roots (where the flanks and the troughs meet) and crests touch, the radial load component may be increased in the same manner as tapered parts being forced together. Larger tapers may stab more effectively, but have a larger axial to radial translation. Further, the outer diameter and inner diameter of the threaded connectors have set values (related to the size of the tubulars of which they are a part), which in turn limits the available shoulder areas. A larger taper leaves less available shouldering area which may limit the torsional capacity of the connection.

Bending is an additional load component that also affects the connection. When bending occurs, outer thread form (as viewed from the side) is subjected to additional axial tension, which results in an associated increase in the radial component of thread loading. Additionally, bending may cause displacement in the connection, which reduce the thread engagement between the threads 404, 405 and increase the likelihood of a connection failure.

Overall, in some embodiments, the combination of pitch, thread height, and taper angle may allow the shouldering area to be maximized and substantially increases the torsional capacity of the connection. Further, the pitch and thread height combination results in a short, wide thread that is resistant to cross-threading and damage during stabbing. For example, instead of cross-threading, the connection may lock during threading and not advance, thereby avoiding damage to the threads.

Referring again to the specific example of the threads 404, 405 shown in FIG. 4, the corner between the load flank 414 and the outer surface 419 of the threads 404 may be received into, and slide along the corner between the load flank 410 and the trough 412 of the threads 405, as the connection between the inner body 402 and the outer body 400 is made. In addition to providing a kick-out feature, the curving of the corners may avoid causing a galling effect, or otherwise increasing a resistance to disconnecting the outer and inner bodies 400, 402. This may assist in disconnecting the outer and inner bodies 400, 402, and may thus form part of the kick-out feature.

Further, the stabbing flanks 406, 414 and the load flanks 410, 418 may be angled, e.g., forming acute angles $\gamma_1$, $\gamma_2$, $\gamma_3$, $\gamma_4$ with respect to the inner and outer surfaces 409, 419, as shown. Specifically, $\gamma_1$ may be defined between the stabbing flank 406 and the inner surface 409, $\gamma_2$ may be defined between the load flank 410 and the inner surface 409, $\gamma_3$ may be defined between the stabbing flank 418 and the outer surface 419, and $\gamma_4$ may be defined between the load flank 418 and the outer surface 408. In some embodiments, the angles $\gamma_1$ and $\gamma_2$ may be the same, and the angles $\gamma_3$ and $\gamma_4$ may be the same (whether or not the same as the angles $\gamma_1$ and $\gamma_2$), such that the respective threads 404, 405 are symmetric. In other embodiments, the angles $\gamma_1$ and $\gamma_2$ and the angles $\gamma_3$ and $\gamma_4$ may be different. For example, the angles $\gamma_2$ and $\gamma_3$ may be between about 70 degrees and about 89 degrees, e.g., between about 79 degrees and about 86 degrees, and the angles $\gamma_1$ and $\gamma_4$ may be between about 29 degrees and about 70 degrees, e.g., about 60 degrees. Load flank angling may minimize axial-to-radial translation and may facilitate stress flow from the thread itself to the tubular on which the connection is defined, and may minimize "hot spots" of concentrated stress regions. The relative angling of the threads 404, 405 may also assist with disconnection of the outer and inner bodies 400, 402, and may thus be considered part of the kick-out feature.

Further, the outer and inner bodies 400, 402 may be tapered. A tapered connection typically increases the axial-to-radial translation. In general, the taper increases the angle of the flank which increases the radial component of the loading of the connection. The taper may also worsen any condition where a thread jump occurs, because the engagement of the box and pin thread forms is reduced when the pin (inner body) is moved axially out of the connection. Additionally, when the box and pin components are engaged in a manner that the roots and crests of the thread forms touch, the radial load component is increased in the same manner as tapered parts being forced together. Larger tapers typically stab more easily, but may have a larger axial-to-radial translation. Further, the radial dimensions of the pin and box ends may have set values, related to the dimensions of the tubulars of which they are a part, which in turn may constrain the available shoulder areas. A larger taper leaves less available shouldering area which constrains the torsional capacity of the connection.

For example, the outer and inner bodies 400, 402 may each define a taper angle $\alpha$ of between about 0.8 degrees and about 1.5 degrees, e.g., about 1.2 degrees, with respect to a line drawn straight in the axial direction, as shown. Generally, the angle $\alpha$ ranges within the values that correspond to a diametral taper of 0.25 inch per foot to 1.00 inch per foot, e.g., between about 0.37 inches per foot and about 0.88 inches per foot.

It will be appreciated that the relative shape and sizes of the threads 404, 405 may be changed, which may change the surfaces thereof that engage one another, or form gaps therebetween, as the inner body 402 and the outer body 400 are connected together.

FIGS. 5A, 5B, 5C, and 5D illustrate side, cross-sectional views of several embodiments of a connection made between an inner body 500 and an outer body 502. Beginning with FIG. 5A, the inner body 500 may be a pin-end connector, e.g., of one of the tubulars of the tubular string 100 discussed above with reference to FIG. 1, while the outer body 502 may be a box-end connector of such tubulars, or of a tubular coupling, such as the tubular coupling 300 discussed above with reference to FIG. 3.

The inner body 500 may include threads 504, a sealing surface 506, and a torque nose 508. The threads 504 may be or include an external helical ridge, which shown in cross-section, appears as a plurality of crests 510 and troughs 512. Each of the crests 510 may include a load flank 513, an outer surface 514, and a load flank 515. In an embodiment, as shown, the load flanks 513 may have a chamfered profile, e.g., defining a chamfer 517 between the load flank 513 and the outer surface 514, such that an angled surface takes the place of a sharp corner therebetween.

The outer body 502 may include threads 516, which may be a helical internal ridge that, in cross-section, appears as a plurality of crests 518 and troughs 520. Each of the crests 518 may include a stabbing flank 522, an inner surface 524, and a load flank 526. The load flanks 526 may be shaped to receive and engage the load flanks 513, and thus may each include an inverse chamfer 527 where the load flanks 526 meet the troughs 520. Further, a gap may be defined between the load flanks 515 and the stabbing flanks 522 when the inner body 500 is connected to the outer body 502 via the engaging threads 504, 516. Additionally, the gap may extend between the inner surface 524 of the crest 518 and the trough 512.

FIG. 5A also illustrates additional details of an embodiment of the torque nose 508. As shown, the torque nose 508 may be tapered with respect to a radial line, e.g., at an angle $\theta$. The sealing surface 506 may also be tapered with respect to an axial line, e.g., at an angle $\mu$. The angle $\theta$ may, in some embodiments, be about three times the angle $\mu$. This tapering may facilitate the formation of a seal between the sealing surface 506 and a reciprocal sealing surface (not shown in FIGS. 5A-5D) of the outer body 502, such that the torque nose 508 and sealing surface 506 form a wedge that drives into a corner between the torque-stop surface (not shown in FIGS. 5A-5D) and the sealing surface.

Figure 5B:
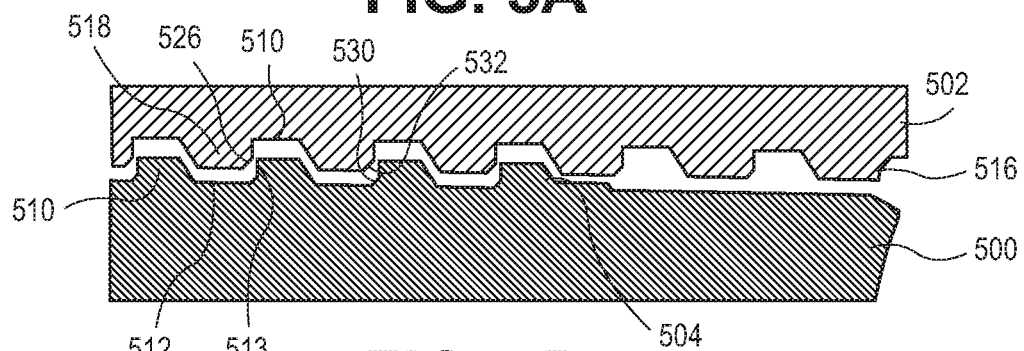

FIG. 5B illustrates another embodiment of the threads 504, 516 of the inner and outer bodies 500, 502, respectively. In this embodiment, the crest 510 may define an inverse chamfer 530 where the load flank 513 meets the trough 512. Complementarily, the crest 518 may define a chamfer 532 wherein the load flank 526 meets the inner surface 524.

Figure 5C:
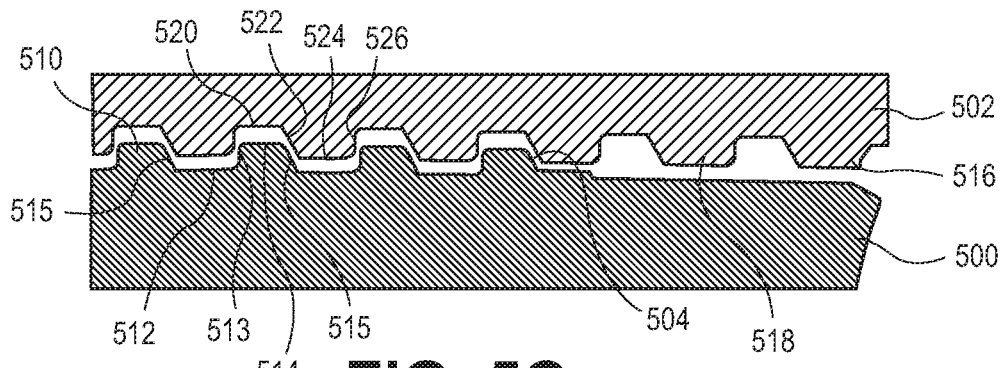

FIG. 5C illustrates another embodiment of the threads 504, 516. In this embodiment, the crest 518 defines a rounded, concave corner between the load flank 526 and the inner surface 524, while the crest 510 defines a rounded, convex corner between the load flank 513 and the trough 512.

Figure 5D:
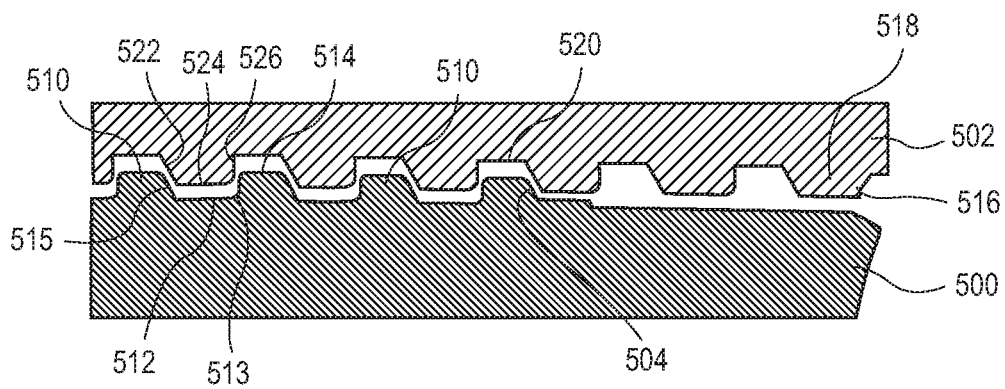

FIG. 5D illustrates yet another embodiment of the threads 504, 516. In this embodiment, the crest 510 defines a rounded, convex corner between the load flank 513 and the outer surface 514, and a rounded, concave corner between the load flank 513 and the trough 512. Further, the crest 518 defines a rounded, convex corner between the load flank 526 and the inner surface 524. The rounded, concave corner between the load flank 513 and the trough 512 may receive the rounded, convex corner between the load flank 526 and the inner surface 524, and the rounded, convex corner between the load flank 513 and the inner surface 524 may be prevented, by its shape, from engaging the rectilinear corner formed between the load flank 526 and the trough 520.

Accordingly, as shown, the threads 504 have a rounded corner between the trough 512 and the load flank 513, and another rounded corner between the load flank 513 and the outer surface 514. This creates an 'S'-shape between the two adjacent, rounded corners. The corner between the load flank 526 and the inner surface 524 of the threads 516 may be squared-off, rather than also forming an 'S'-shape. Briefly, mating together two sets of threads with such an 'S'-shape may present challenges as a consequence of manufacturing variability, which can compromise the contact between the two thread forms. Compromised contact between the two thread forms can adversely affect the integrity of the overall connection. Thus, in this embodiment, the inner surface 524 may be spaced farther away from the trough 520 than in an 'S'-shaped thread form, and the corner between the load flank 526, and inner surface 524 may be squared-off, allowing for increased contact between the two threads 504, 516. In particular, the line contact between load flank 526 and load flank 513 may be maximized, regardless of manufacturing variability.

Figure 6:
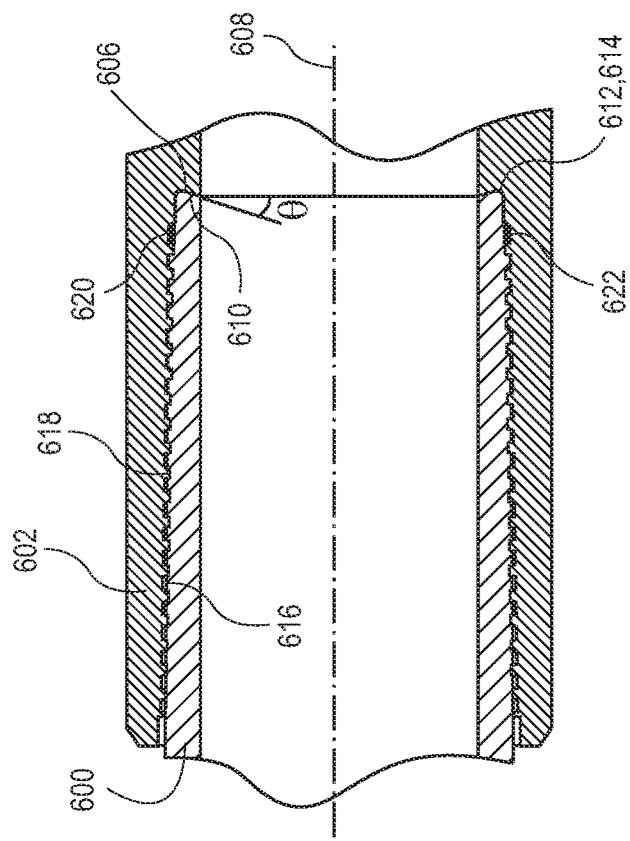
FIG. 6 illustrates a side, cross-sectional view of an inner body connected to an outer body, according to an embodiment.

FIG. 6 illustrates a side, cross-sectional view of an inner body 600 received into and connected with an outer body 602, according to an embodiment. The inner body 600 may be a tubular, such as the first tubular 104 discussed above with reference to FIG. 1. The outer body 602 may be either the second tubular 106 (FIG. 1) or the coupling 300 (FIG. 3).

The inner body 600 may include a torque nose 606, which may extend at an angle θ with respect to a line extending parallel to a central axis 608 of the inner and outer bodies 600, 602. The outer body 602 may include a torque-stop surface 610, which may also extend at the angle θ, so as to engage the torque nose 606 when the inner body 600 is received therein.

Figure 7:
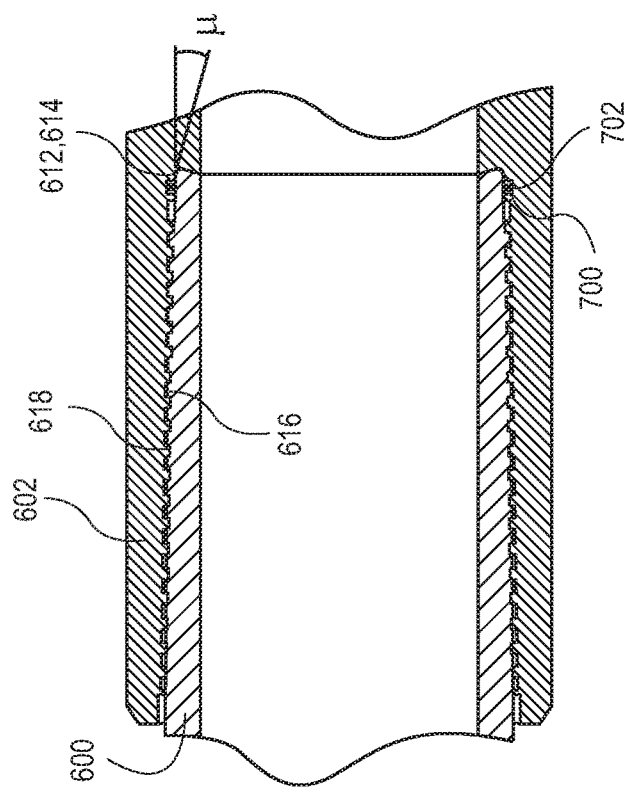
FIG. 7 illustrates another side, cross-sectional view of an inner body connected to an outer body, according to an embodiment.

Further, the outer body 602 may include a sealing surface 612 that faces generally radially inward (i.e., toward the central axis 608). In an embodiment, the sealing surface 612 may extend at the angle μ (see FIG. 7). The inner body 600 may include a radially-facing sealing surface 614 that faces generally radially outwards, and also extends at the angle μ. As noted above, the ratio of the angle θ to the angle μ may be about 3:1 in some embodiments.

Accordingly, as the inner body 600 is advanced into the outer body 602, eventually the torque nose 606 may engage the torque-stop surface 610. These engaging tapered surfaces may thus cause the torque nose 606 to be driven radially outwards by continued advancement of the inner body 600 relative to the outer body 602. This may drive the sealing surfaces 612, 614 together, forming a metal-to-metal seal therebetween.

Further, in some embodiments, threads 616 of the inner body 600 may terminate before the torque nose 606, and threads 618 of the outer body 602 may terminate before the torque-stop surface 610. A thread relief 620 may be defined within the outer body 602, proximal to the torque-stop surface 610. In some embodiments, a sealing element 622 may be positioned therein, as shown. In other embodiments, such as that shown in FIG. 7, a seal groove 700 may be defined in the outer body 602 in which a sealing element 702 may be positioned. The sealing elements 622, 702 may be any suitable sealing element, e.g., elastomeric, composite (e.g., carbon-fiber material), etc., in any suitable shape, e.g., rounded or square in cross-section, etc. Thread relief meant to run threader all the way across and stop.

Figure 8:
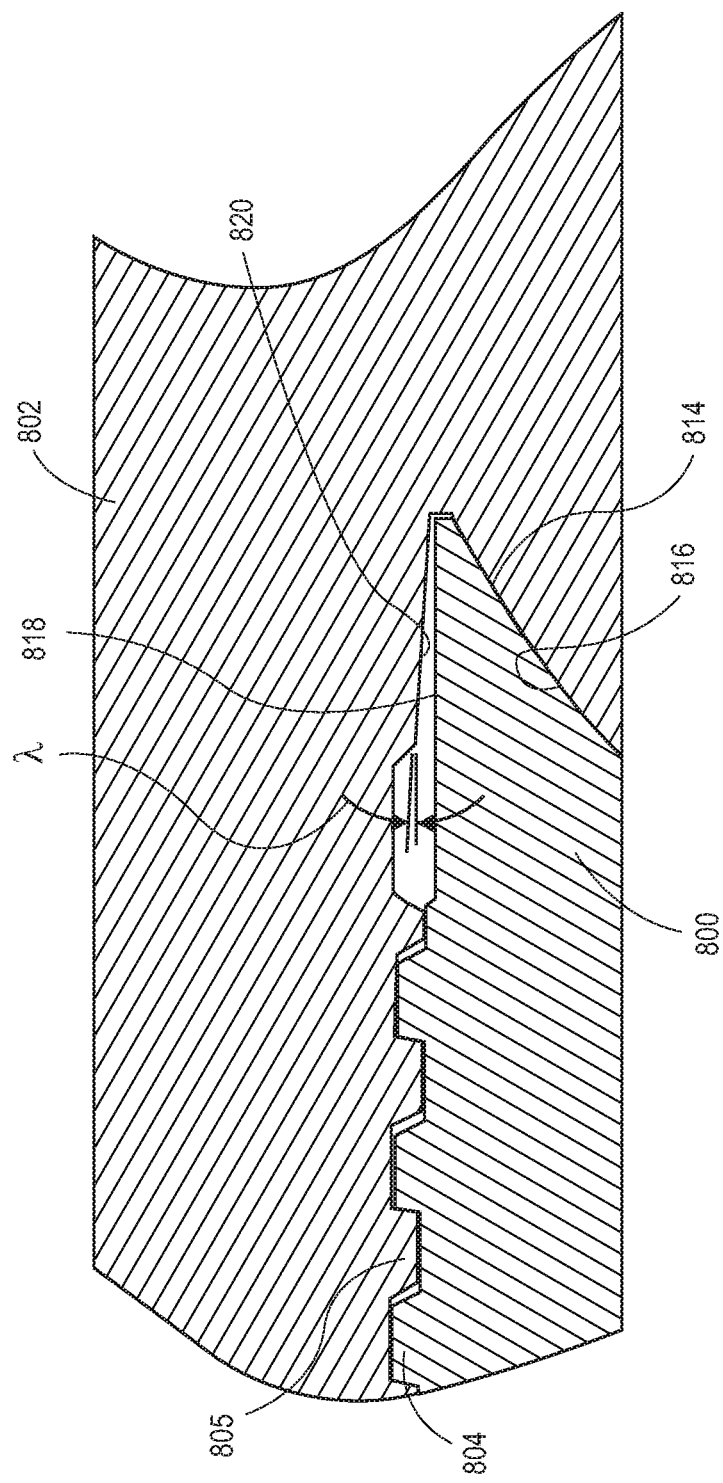
FIG. 8 illustrates an enlarged, partial, side, cross-sectional view of an inner body connected to an outer body, according to an embodiment.

FIG. 8 illustrates a side, cross-sectional view of another connection between an inner body 800 and an outer body 802, according to an embodiment. As shown, the inner body 800 may include threads 804, which may engage with threads 805 of the outer body 802, so as to secure the connection therebetween.

The inner body 800 may define a torque nose 814, which may engage a torque-stop surface 816 of the outer body 802 when the inner and outer bodies 800, 802 are connected together. The torque nose 814 and the torque-stop surface 816 may each be at least partially curved in cross-section, with the torque nose 814 being generally concave and the torque-stop surface 816 being generally convex. At least part of the torque nose 814 may thus form a structure analogous to a socket, and at least part of the torque-stop surface 816 forms a structure analogous to a ball, such that the two together form an interface analogous to a ball-and-socket joint. Further, a radial outer surface 818 of the inner body 800, extending from and adjacent to the torque nose 814 may be spaced apart from a radial inner surface 820 of the outer body 802, extending from and adjacent to the torque-stop surface 816. Further, the radial inner surface 820 may be inclined at an angle λ with respect to a line drawn parallel to the central axis of the inner and outer bodies 800, 802. Accordingly, the interface between the torque-stop surface 816 and the torque nose 814 may allow for the inner body 800 and the outer body 802 to flex at the connection, while minimizing or avoiding damage thereto.

Figure 9:
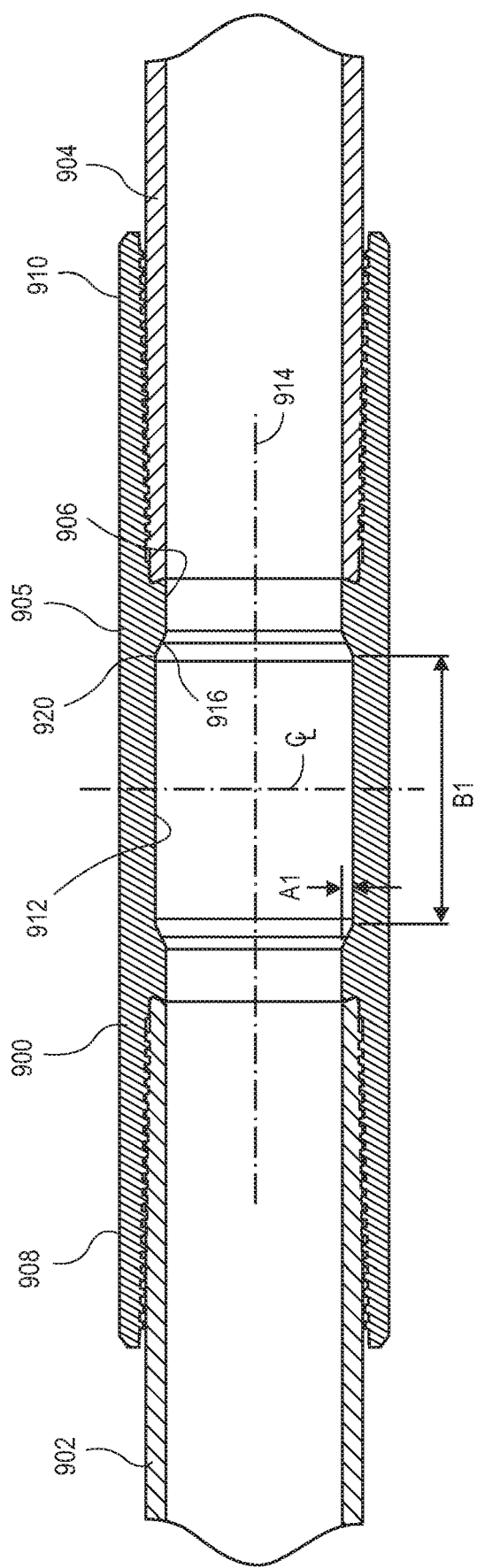
FIG. 9 illustrates a side, cross-sectional view of a tubular coupling that couples together a first tubular and a second tubular, according to an embodiment.

FIG. 9 illustrates a side, cross-sectional view of a tubular coupling 900 for connecting together a first tubular 902 and a second tubular 904, according to an embodiment. The tubular coupling 900 may be similar to the tubular coupling 300 discussed above with reference to FIG. 3. The tubular coupling 900 may have a body 905 and may define a bore 906 therethrough. The tubular coupling 900 may also define a first connector 908 configured to receive and connect to the first tubular 902 and a second connector 910 configured to receive and connect to the second tubular 904. The first and second connectors 908, 910 may include any combination of the features of the outer bodies discussed hereinabove. Further, the bore 906 may extend between the first and second connectors 908, 910 so as to provide fluid communication therebetween, allowing communication between bores of the first and second tubulars 902, 904.

The body 905 may define an undercut section 912 therein, which may be formed as a radially-enlarged portion of the bore 906, between the first and second connectors 908, 910. Accordingly, a thickness of the body 905 at the undercut section 912 may be reduced as compared to regions adjacent to the undercut section 912. This may facilitate bending of the tubular coupling 900 by reducing the bending stiffness thereof. Further, the undercut section 912 may serve as an inner profile for connection with a tool deployed into the tubulars. In other words, the undercut section 912 may function as a "landing nipple."

In one embodiment, the undercut section 912 is defined symmetrically about a centerline CL of the tubular coupling 900, with the centerline CL extending radially at an axial middle of the body 905. In another embodiment, the undercut section 912 may be asymmetric about the centerline CL. In an embodiment, the undercut section 912 may have a length B1 and a depth A1, as shown. The length B1 may be between about 0.25 inches and about 4 inches along a longitudinal axis 914 of the tubular coupling 900. The depth A1 may be between about 0.1 inches and about 0.5 inches.

Also shown, according to one example embodiment, is a taper 916, which provides a smooth transition from the bore 906 to the undercut section 912. The taper 916 may reduce or avoid stress risers that may accompany abrupt changes in geometry. The taper 916 may be between about 10 and about 70 degrees relative to the longitudinal axis 914 of the tubular coupling 900.

Additionally, a radius 920 is shown, as part of the specific, illustrated embodiment. The radius 920 provides a smooth transition from the taper 916 to the undercut section 912. The radius 920 may reduce stress risers at the transition from the undercut section 912 to the taper 916. The radius 920 may be between about 0.125 inches and about 0.375 inches.

As shown in FIG. 9, the undercut section 912 has a profile that is substantially parallel to the longitudinal axis 914 of the tubular coupling 900. In another embodiment, the undercut section 912 may be disposed at an angle relative to the longitudinal axis 914 of the tubular coupling 900. As also shown in FIG. 9, the undercut section 912 has an inner diameter that is substantially the same along the length B1 of the undercut section 912. In another embodiment, the undercut section 912 may have more than one inner diameter along the length B1 of the undercut section 912, such that the undercut section 912 has a stepped profile. The stepped profile of the undercut section 912 may be used as a landing or profile nipple for a wellbore operation, in some embodiments.

Figure 10:
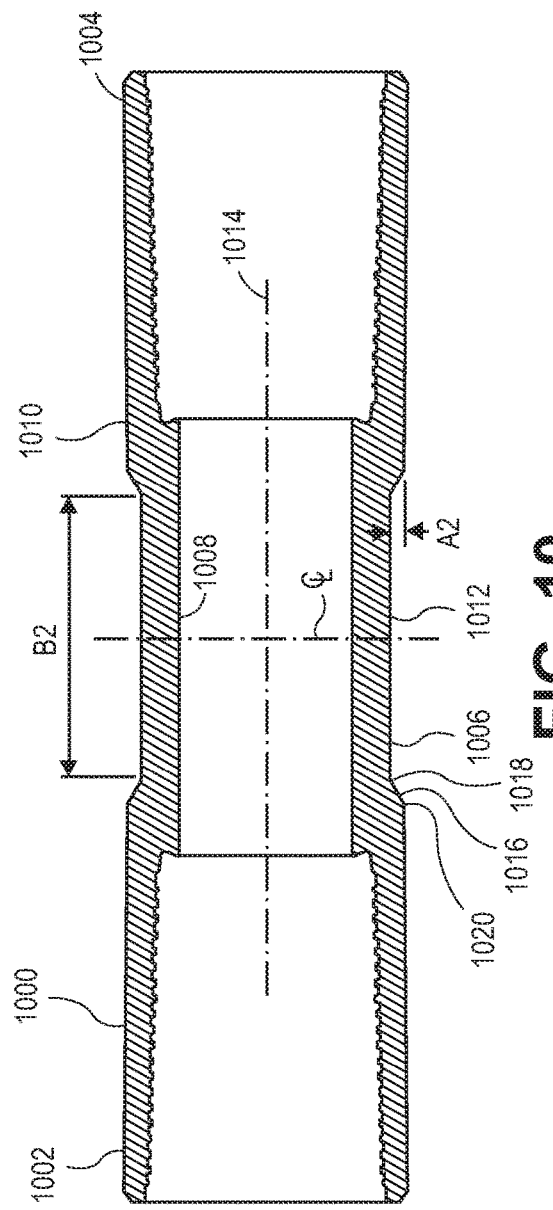
FIGS. 10 and 11 illustrate side, cross-sectional views of two embodiments of a tubular coupling that is configured to couple a first tubular and a second tubular together, according to an embodiment.

FIG. 10 illustrates a side, cross-sectional view of a tubular coupling 1000, according to an embodiment. The tubular coupling 1000 may be similar in structure and function to the tubular coupling 900, and may be configured to receive and connect together two tubulars (not shown). As such, the tubular coupling 1000 may define a first connector 1002 and a second connector 1004, which may be internally threaded so as to connect to the tubulars. The first and second connectors 1002, 1004 may include any combination of the features of the outer bodies discussed hereinabove.

The tubular coupling 1000 may include a body 1006, in which a bore 1008 is defined extending between the first and second connectors 1002, 1004, such that the tubulars may be in fluid communication with one another when connected to the tubular coupling 1000. Further, the body 1006 may include an outer diameter surface 1010, which may extend substantially along its axial length and may be generally cylindrical.

The body 1006 may also define a turndown section 1012 in the outer diameter surface 1010, e.g., between the first and second connectors 1002, 1004. The radial thickness of the body 1006 at the turndown section 1012 may be reduced by provision of the turndown section 1012. In an embodiment, the turndown section 1012 may be defined symmetrically about a centerline CL of the tubular coupling 1000, but in other embodiments, may be asymmetrical to the centerline CL. The turndown section 1012 may be formed in the body 1006 using any suitable process or device, such as by cutting using a lathe, mill, or any other cutting device or process, or as part of the formation of the tubular coupling 1000 itself, e.g., casting, sintering, etc.

The turndown section 1012 may define a length B2 and a depth A2, as shown. The length B2 may be between about 0.25 inches and about 4 inches along a longitudinal axis 1014 of the tubular coupling 1000. The depth A2 may be between about 0.01 inches and about 0.5 inches.

Also shown is a taper 1016, which provides a smooth transition between the turndown section 1012 and the adjacent regions of the outer diameter surface 1010 of the body 1006. The taper 1016 may prevent stress risers that may accompany abrupt changes in geometry. Further, a radius 1018 is shown, which provides a smooth transition from the taper 1016 to the turndown section 1012. A radius 1020 is also shown, which provides a smooth transition from the taper 1016 to the outer diameter surface 1010. The radii 1018 and 1020 may each be between about 0.060 inches and about 0.375 inches. In addition to mitigating stress rises, the taper 1016 and/or radii 1018, 1020 may provide a smooth geometry that minimizes the chance of the turndown section 1012 catching or hanging up on changes in the wellbore or well-control stack during downhole operations.

Figure 11:
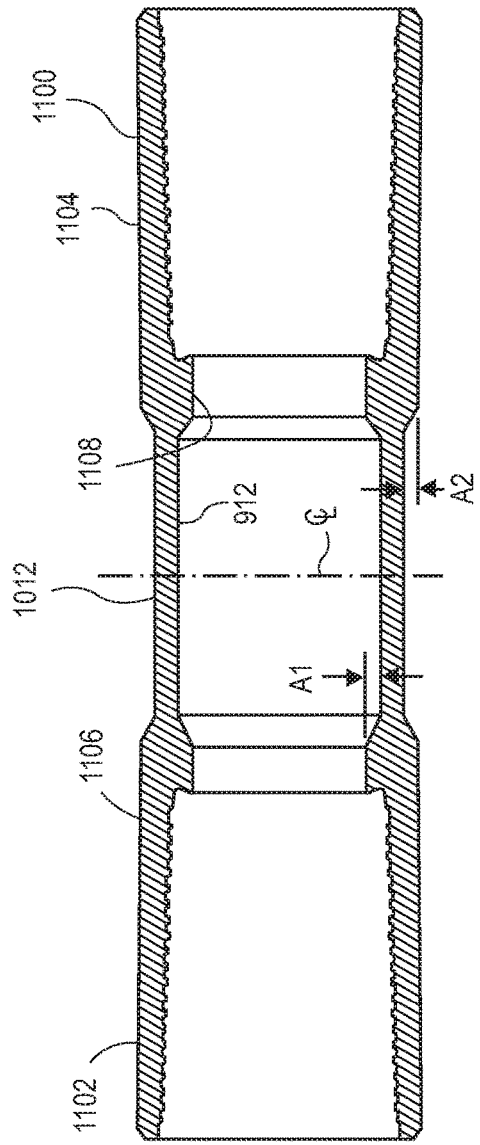

FIG. 11 illustrates a side, cross-sectional view of a tubular coupling 1100 for connecting together two tubulars (not shown), according to an embodiment. The tubular coupling 1100 may be similar to the tubular couplings 900, 1000 and similar features may be given the same reference numbers. The tubular coupling 1100 may include first and second connectors 1102, 1104 having internal threads and being configured to receive and connect together the two tubulars. The first and second connectors 1102, 1104 may include any combination of the features of the outer bodies discussed hereinabove. Further, the tubular coupling 1100 may have a body 1106, in which a bore 1108 may be defined, extending between the two connectors 1102, 1104, such that the tubulars may fluidly communicate through the bore 1108 when connected to the body 1106.

The tubular coupling 1100 may include both the undercut section 912 and the turndown section 1012. In an embodiment, the undercut section 912 and the turndown section 1012 may both be defined symmetrically about the centerline CL, and may extend by about the same axial dimension, such that they are axially-aligned. As such, the radial thickness of the body 1106 may be diminished by provision of both the undercut section 912 and the turndown section 1012.

Figure 12:
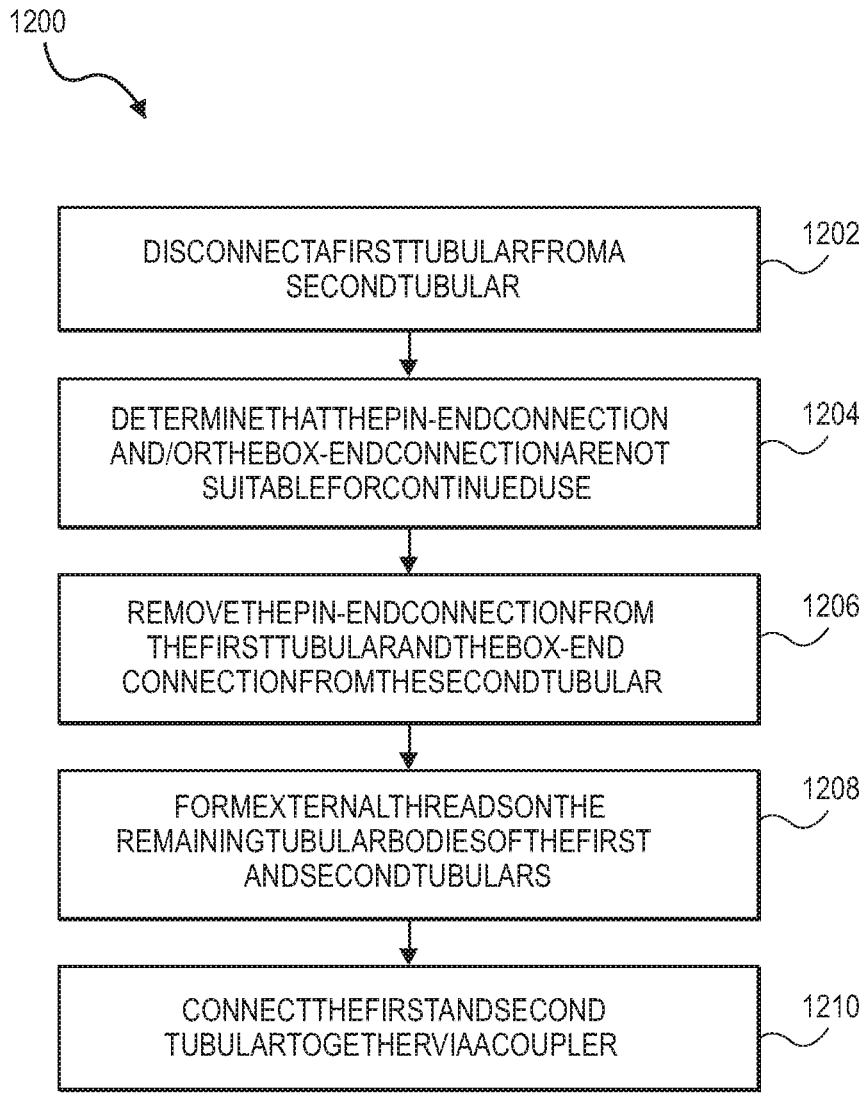
FIG. 12 illustrates a flowchart of a method for connecting together two tubulars, according to an embodiment.

A method for coupling together two tubulars, e.g., using one of the embodiments of the tubular couplings described herein, may now be appreciated. FIG. 12 illustrates a flowchart of an example of such a method 1200, according to an embodiment. In addition, FIGS. 13-15 illustrate the structures employed with the method 1200 at various stages of the method 1200, according to an embodiment.

The method 1200 may begin at 1202, by disconnecting a first tubular from a second tubular. Referring to FIG. 13, there is shown such a first tubular 1302 disconnected from a second tubular 1304. In particular, the disconnection may occur as part of routine oilfield operation (e.g., "tripping out"), or in response to an event, such as a detection of a failure of a connection. The first tubular 1302 may be rotated relative to the second tubular 1304, such that a pin-end connection 1306 of the first tubular 1302 is disengaged and removed from a box-end connection 1308 of the second tubular 1304.

Referring again additionally to FIG. 12, the method 1200 may include determining that the pin-end connector 1306 and/or the box-end connector 1308 are damaged, worn, or otherwise no longer safely, reliably suited for use, as at 1204. The method 1200 may then include removing the pin-end connector 1306 and the box-end connector 1308 from the first and second tubulars 1302, 1304, respectively, as at 1206, leaving tubular bodies 1305, 1307. FIG. 14 illustrates the first and second tubulars 1302, 1304 after such removal. The removal of the pin-end connector 1306 and the box-end connector 1308 may be accomplished using any suitable method, e.g., cutting with a saw, mill, lathe, torch, etc.

The method 1200 may then include forming external threads on the remaining tubular bodies 1305, 1307 of the first and second tubulars 1302, 1304, as at 1208. FIG. 15 illustrates such external threads 1500, 1502. The form of the threads 1500, 1502 may be substantially the same, or may be different. Further, one or both of the threads 1500, 1502 may take the form of one or more of the thread forms described herein, e.g., with respect to FIGS. 4 and/or 5A-5E. Stated otherwise, once cut and provided with new threads 1500, 1502, the first and second tubulars 1302, 1304 may each incorporate one or more embodiments of the inner bodies discussed hereinabove. Accordingly, one or both of the threads 1500, 1502 may include kick-out features, and the first and second tubulars 1302, 1304 may include tapered torque noses, radial sealing surfaces, etc.

Referring again to FIG. 12 and advancing in the method 1200, the method 1200 may include connecting the first and second tubulars 1302, 1304 together by connecting the threads 1500, 1502 to a tubular coupling 1506, which is also illustrated in FIG. 15. The tubular coupling 1506 may be or include any combination of features described above for the various tubular couplings and/or outer bodies, e.g., undercut sections, turndown sections, radial sealing surface, torque-stop surfaces, thread reliefs, etc. Further, the tubular coupling 1506 may define an axial length L. The axial length L may be sufficient not only to receive the threads 1500, 1502 of the tubulars 1302, 1304 therein, but also to increase the length of the combination of the first and second tubulars 1302, 1304 to compensate for the removed pin-end connector 1306 and the box-end connector 1308.

In some embodiments, the coupling 1506 may include one or more spirals (not shown) on an outer surface of the tubular coupling. The spiral may be formed in the outer surface of the tubular coupling by a machining process (e.g., machining a groove or a protrusion). The spiral may also be formed on the outer surface from one or more layers of a thermal spray, such as WEARSOX®, which is commercially available from Antelope Oil Tool & Mfg. Co., LLC. The spiral may be configured to reduce the surface area of the tubular coupling in contact with the surrounding wellbore during the wellbore operation. Further, the spiral may be configured to agitate debris from the wellbore by directing flow generated as the tubular coupling is rotated during the wellbore operation, particularly in a highly deviated wellbore. The spiral may also reduce the friction between the tubular coupling and the surrounding wellbore because the tubular coupling is lifted. In one embodiment, one or more horizontal or vertical grooves (or protrusions) may be used in place of the spiral.

Figure 16:
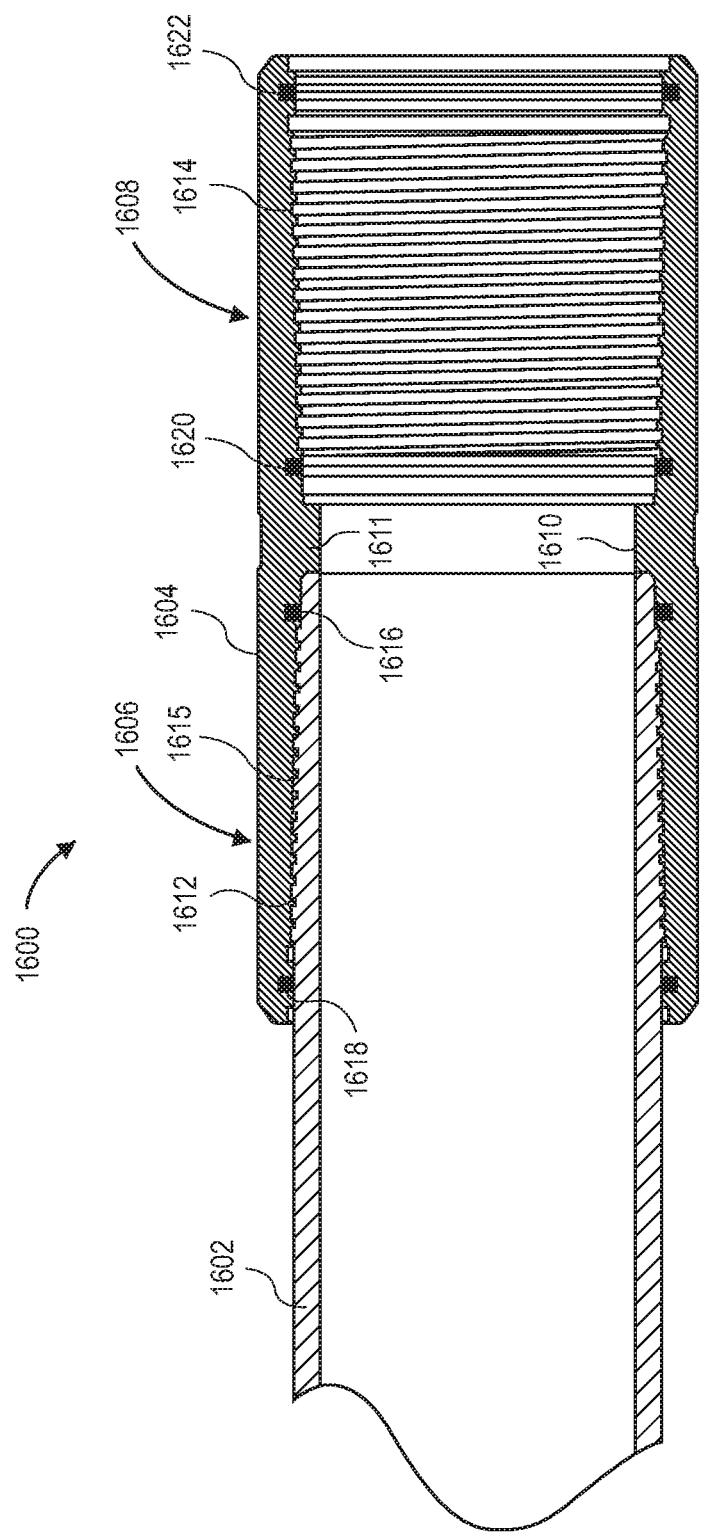
FIG. 16 illustrates a side, cross-sectional view of the first and second tubulars being connected together using a tubular coupling that includes one or more seals, according to an embodiment.

FIG. 16 illustrates a side, cross-sectional view of a connection 1600 including an inner body 1602 and an outer body 1604, according to an embodiment. The inner body 1602 may be a tubular, and, as shown, the outer body 1604 may be a coupling, similar to the coupling 300 discussed above with respect to FIG. 3, or may be a second tubular, e.g., as discussed with respect to FIG. 2.

In the illustrated embodiment, the outer body 1604 may include a first connector 1606 and a second connector 1608, which may be in communication with one another via a bore 1610 defined through the outer body 1604. Further, a shoulder 1611 may be defined between the first and second connectors 1606, 1608. The first connector 1606 may be configured to receive and connect to the inner body 1602, as shown. The second connector 1608 may be configured to connect with another tubular (not shown). For example, the first connector 1606 may include first internal threads 1612 and the second connector may include second internal threads 1614. The first internal threads 1612 may be configured to engage external threads 1615 of the inner body 1602.

Either or both of the first and second connectors 1606, 1608 may include one or more seals. For example, as shown, the first connector 1606 may include an inboard seal 1616 and an outboard seal 1618. The second connector 1608 may also include an inboard seal 1620 and an outboard seal 1622. However, it will be appreciated that any combination of sides and seals may be employed (e.g., one or more of the illustrated seals may be omitted) without departing from the scope of the present disclosure.

Each of the seals 1616, 1618, 1620, 1622, if present, may be seated into a recess or groove formed in the outer body 1604 and extending outwards therefrom. The seals 1616, 1618, 1620, 1622 may be configured to engage, e.g., seal with, the outer circumferential surface of the inner body 1602 (in the case of the seals 1616, 1618; and another, not depicted, inner body in the case of the seals 1620, 1622).

The seals 1616, 1618, 1620, 1622 may be separated axially apart, e.g., may be positioned on or proximate to opposite axial sides of the connectors 1606, 1608, respectively. For example, the inboard seal 1616 may be positioned axially between the outboard seal 1618 and the shoulder 1611. Similarly, the inboard seal 1620 may be positioned between the shoulder 1611 and the outboard seal 1622.

The inboard seals 1616, 1620 provide an auxiliary seal (in addition to a metal-to-metal seal formed between the inner body 1602 and the outer body 1604 as described above). The inboard seals 1616, 1620 may be located in a region that already has tight/controlled tolerances, which lends itself to producing a better seal. Additionally, in this position, smooth machined or formed surfaces may be in contact with the seal during the makeup of the connection, rather than potentially un-machined or rough surfaces.

The outboard seals 1618, 1622 may protect of the threads 1612, 1614 by preventing ingress of fluid to between the engaged threads 1612, 1614 during use. Thus, a sealed chamber may be effectively created between a primary metal-to-metal seal at or near to the nose of the inner body (or bodies) 1602 and the outboard seals 1618, 1622.

A dual-seal configuration including both sets of seals 1616, 1618, 1620, 1622 may combine the functionalities of these two sealing locations. In addition, in some embodiments, the grooves or recesses may be formed in the outer body 1604, but the sealing element may be omitted from one or more of these grooves. This may facilitate inventory management, for example.

Figure 17B:
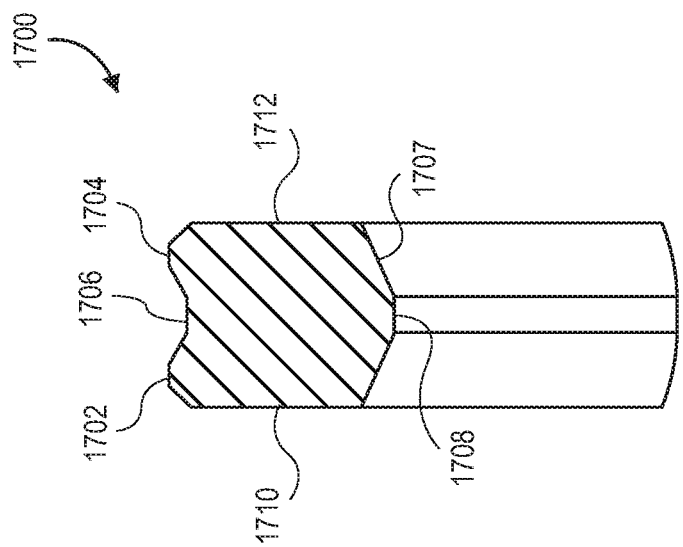
FIG. 17B illustrates a partial, side, cross-sectional view of a sealing element, according to an embodiment.
Figure 17A:
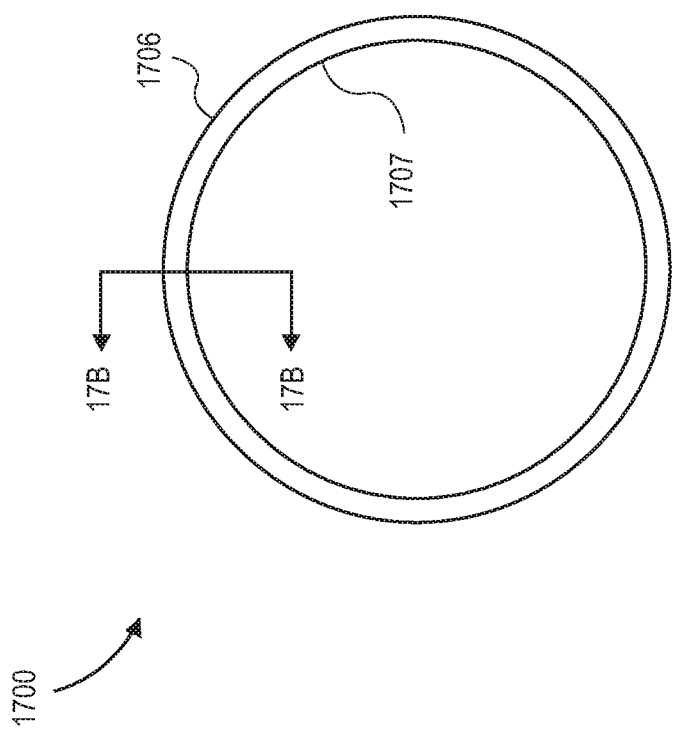
FIG. 17A illustrates an axial end view of a sealing element, according to an embodiment.

FIGS. 17A and 17B illustrate an axial end view and a partial, side, cross-sectional view, respectively, of a sealing element 1700, according to an embodiment. In particular, as indicated, the view of FIG. 17B is taken along line 17B-17B in FIG. 17A.

In an embodiment, the sealing element 1700 may be employed for any one of the seals 1616, 1618, 1620, and/or 1622. Referring specifically to FIG. 17B, the sealing element 1700 may have a cross-sectional shape, which may, for example, include one or more outer ridges (two are shown: 1702, 1704). The outer ridges 1702, 1704 may extend from an outer radial surface 1706 of the sealing element 1700. The outer ridges 1702, 1704 may be separated apart, which may allow for a degree of deflection or compression of the outer ridges 1702, 1704, e.g., pressing the sealing element 1700 into the outer body 1604 (FIG. 16). For example, this may accommodate thermal expansion or any other factor resulting in radial expansion, e.g., of the inner body 1602 (FIG. 16) relative to the outer body 1604.

Further, as seen in the cross-section of FIG. 17B, the sealing element 1700 may also include a tapered inner surface 1707 on a radial inside thereof. The inner surface 1707 may include one or more inner ridges (one shown: 1708). The inner ridge 1708 may be positioned or otherwise configured to engage an inner body (e.g., the inner body 1602 of FIG. 16), and may be configured or otherwise able to deflect or compress, so as to account for expansion of the inner body while maintaining seal integrity. Additionally, the sealing element 1700 may have flat axial sides 1710, 1712, which may facilitate fitting the sealing element 1700 snugly in a square sealing recess, e.g., as compared to a rounded O-ring or the like.

Figure 18A:
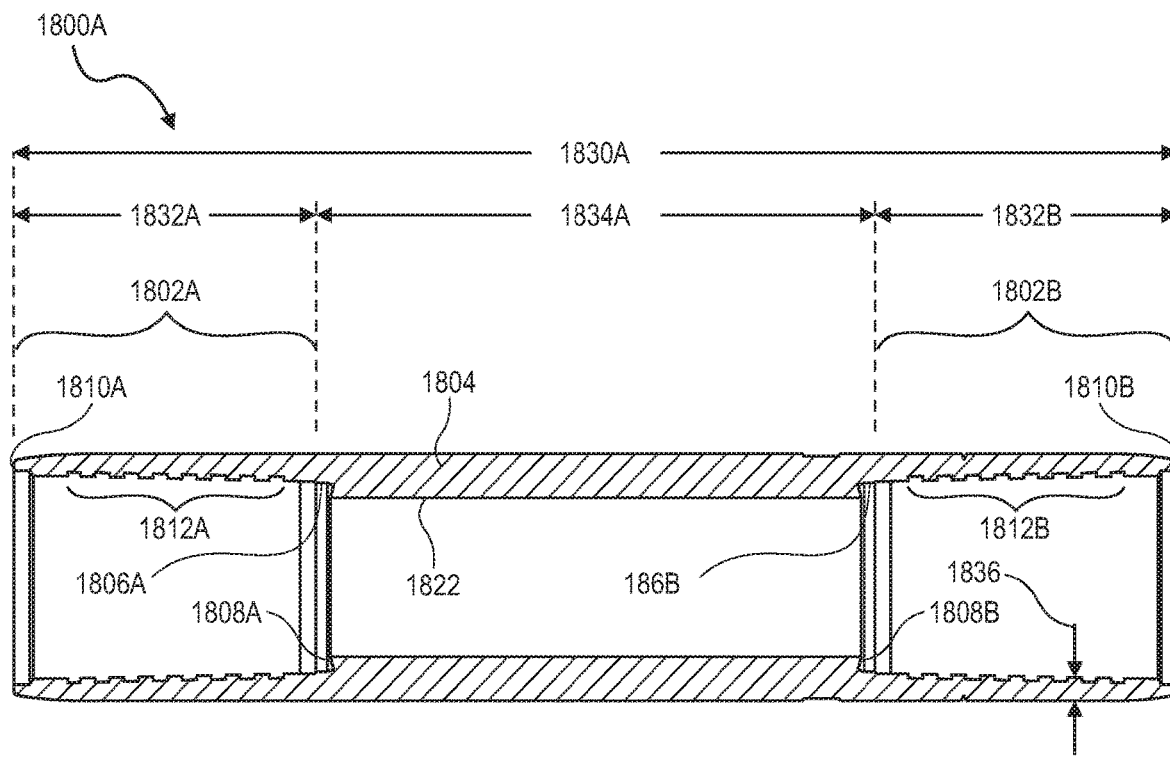
FIGS. 18A-D illustrate side, cross-sectional views of the tubular coupling during sequential stages of the method of FIG. 19, according to an embodiment.

FIGS. 18A-18D illustrate cross-sectional views of a tubular coupling 1800A-D during sequential stages of a method 1900 (described below). As shown in FIG. 18A, the tubular coupling 1800A may be similar to the tubular coupling 300 described above. For example, the tubular coupling 1800A may include two connectors 1802A, 1802B configured to engage corresponding connectors of first and second tubulars. The two connectors 1802A, 1802B may be internally threaded (e.g., box-end connectors).

The tubular coupling 1800A may also include a body 1804, in which the two connectors 1802A, 1802B may be defined. The body 1804 may define sealing surfaces 1806A, 1806B. The sealing surfaces 1806A, 1806B may be on a radially-facing surface of the two connectors 1802A, 1802B and may be configured to engage and form a seal with corresponding radial sealing surfaces of the first and second tubulars. The body 1804 may also define torque-stop surfaces 1808A, 1808B. The torque-stop surfaces 1808A, 1808B may be configured to engage torque noses of the first and second tubulars when connected thereto. The body 1804 may also define end surfaces 1810A, 1810B. The end surfaces 1810A, 1810B may be configured to engage shoulders of the first and second tubulars. The body 1804 may also define threads 1812A, 1812B, which may be configured to engage corresponding threads of the first and second tubulars. The threads 1812A, 1812B may be formed as or similar to any of the thread shapes disclosed herein and/or others. In at least one embodiment, the threads 1812A, 1812B may be internal threads that include at least one kick-out feature including, e.g., a rounded or chamfered corner thereof (e.g., as described above with respect to FIG. 4). The body 1804 may also define a central shoulder 1822 therein, which may partition the two connectors 1802A, 1802B from one another. The central shoulder 1822 may extend radially inward, increasing a thickness of the body 1804 between the two connectors 1802A, 1802B. The body 1804 may also define one or more inboard and/or outboard circumferential grooves for receiving sealing elements (e.g., as described above with respect to FIGS. 16 and 17).

As shown, when the tubular coupling 1800A has a first length 1830A, the two connectors 1802A, 1802B may each have a length 1832A, 1832B, and the shoulder 1822 may have a length 1834A. For example, when the first length 1830 is from about 10 inches to about 15 inches (e.g., 13.325 inches), the length(s) of the first and second connectors 1832A, 1832B may be from about 3 inches to about 5 inches (e.g., about 3.75 inches), and the length 1834 of the shoulder 1822 may be from about 2 inches to about 5 inches (e.g., about 3.132 inches). The two connectors 1802A, 1802B may each have a radial thickness 1836 that decreases proceeding axially away from the shoulder 1822.

In some embodiments, after the tubular coupling 1800A is used (e.g., for the first time), the tubular coupling 1800A may be damaged. For example, the threads 1812A, 1812B may deform during use. When this occurs, the tubular coupling 1800A may be modified to produce the tubular coupling 1800B (in FIG. 18B), which may be suitable for subsequent use.

Figure 18B:
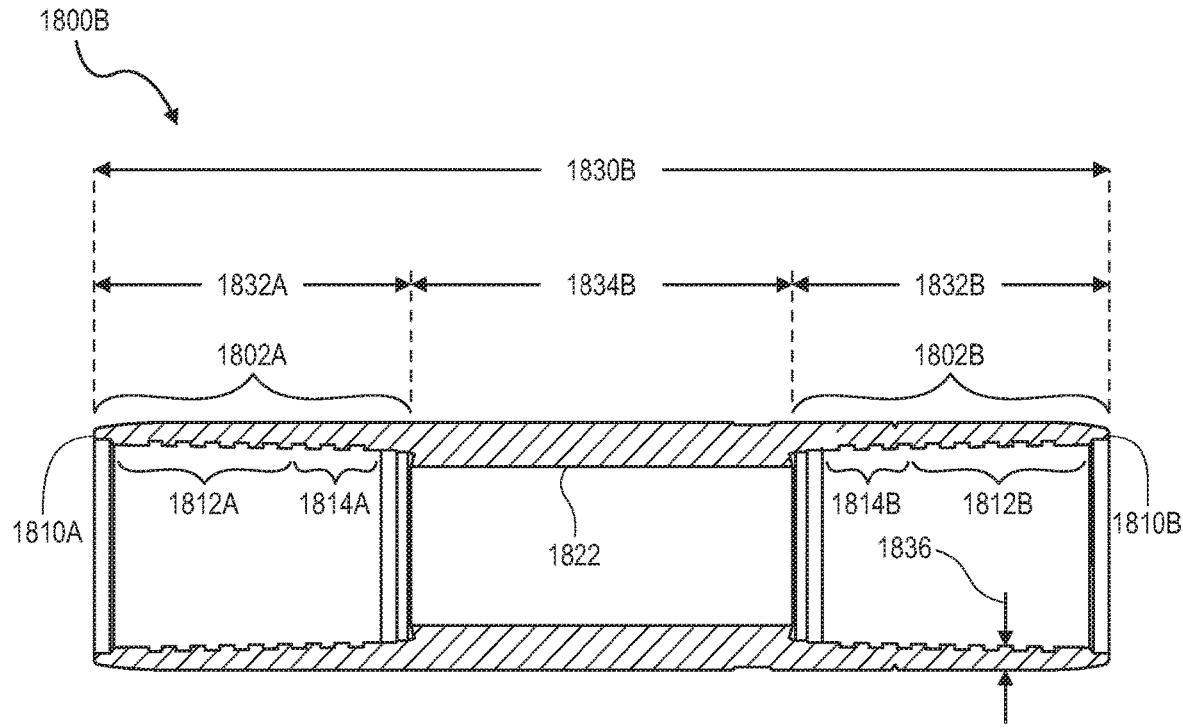
Figure 18C:
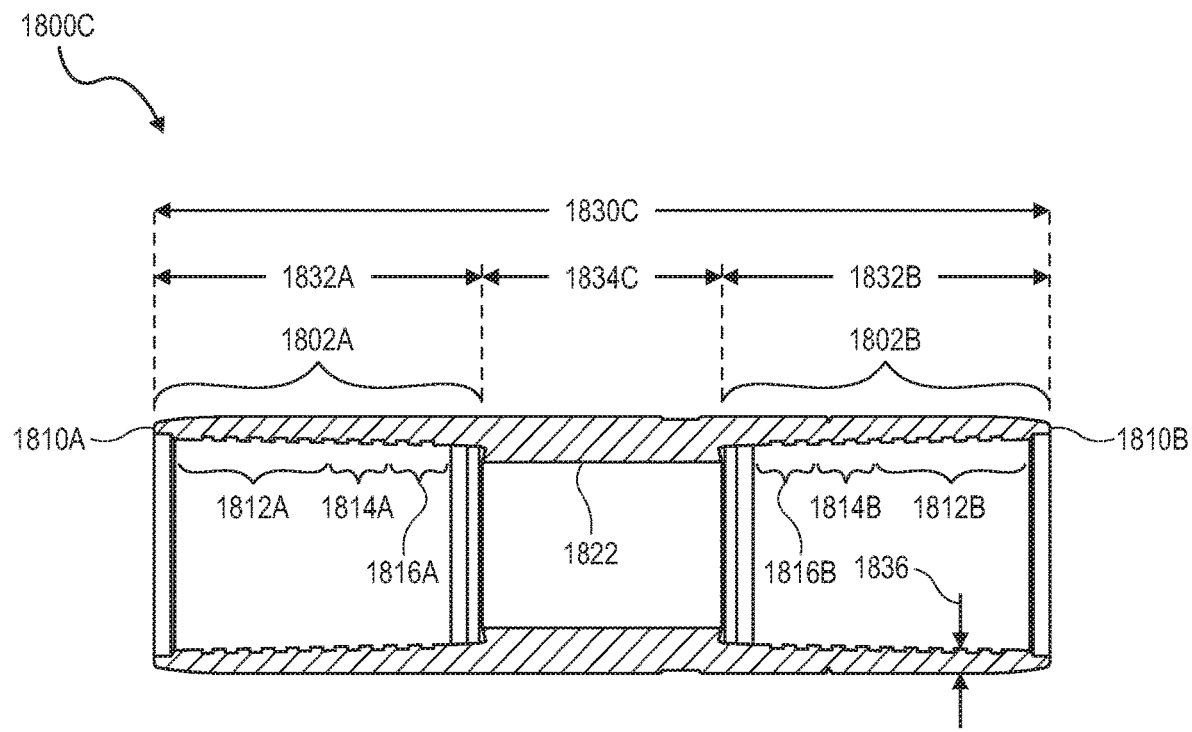
Figure 18D:
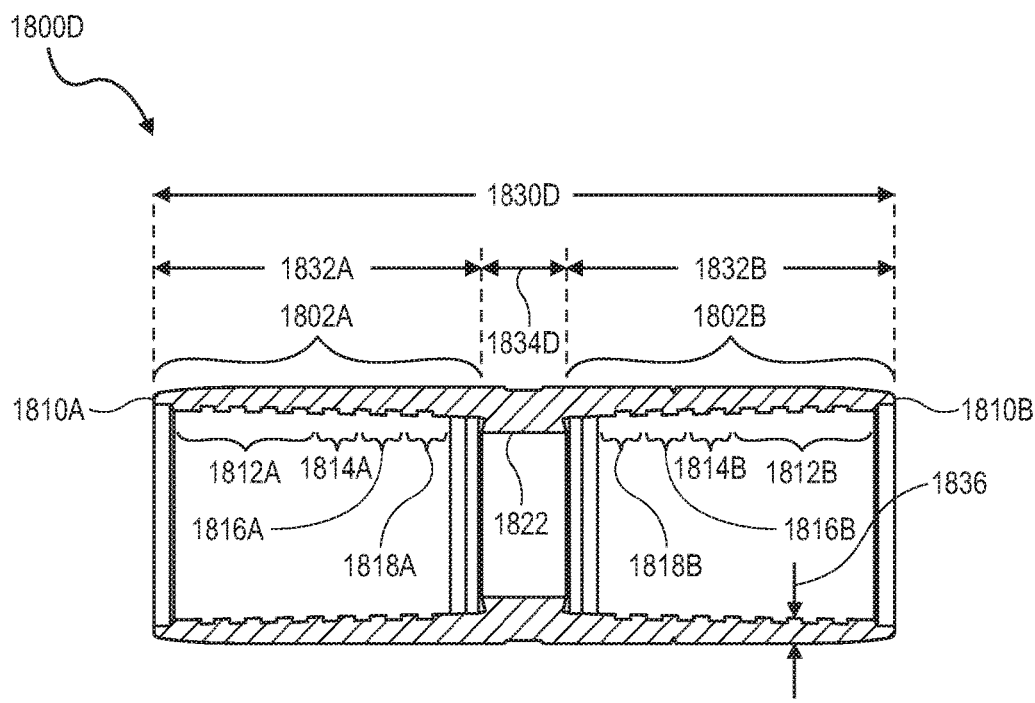
Figure 19:
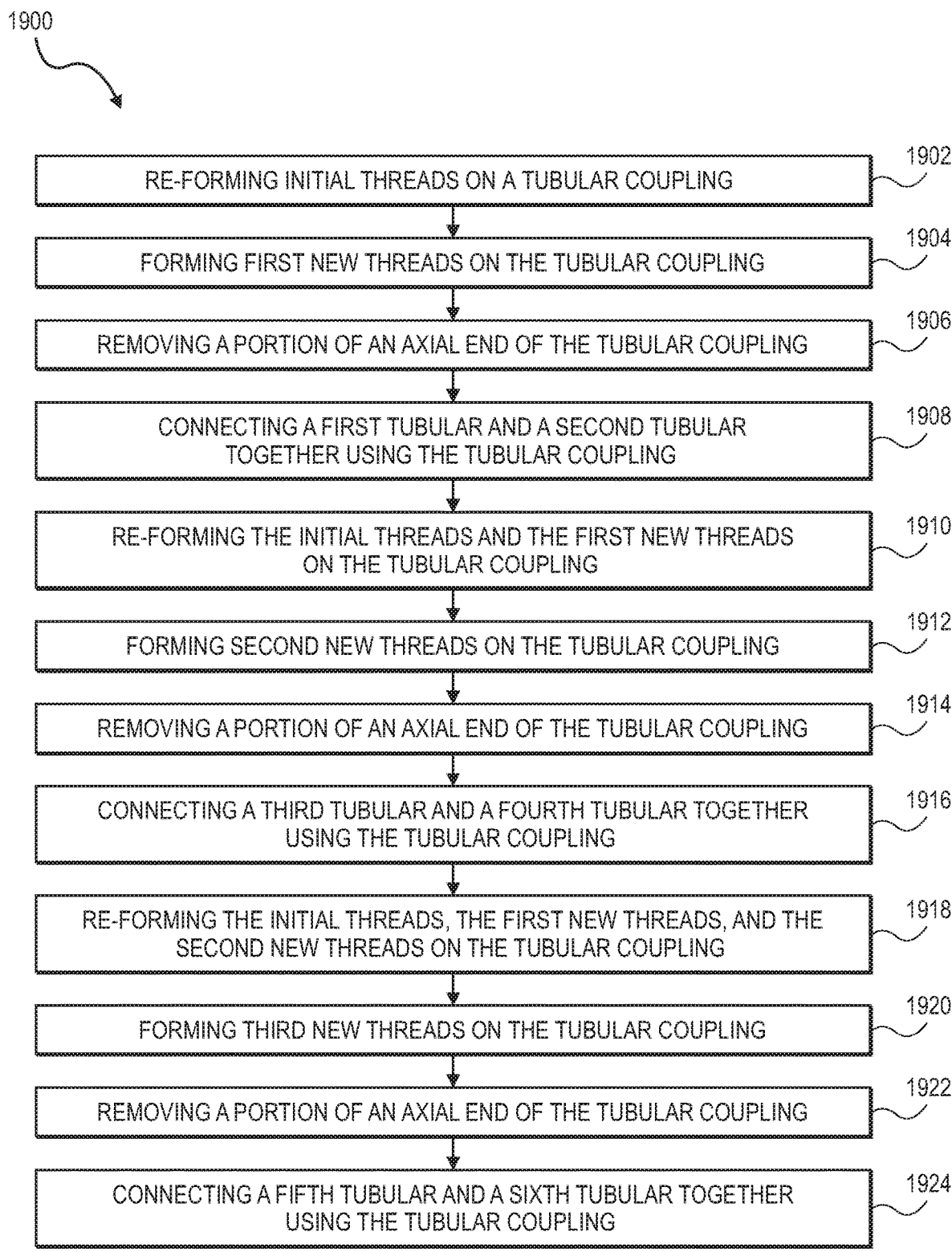
FIG. 19 illustrates a flowchart of a method for modifying the tubular coupling, according to an embodiment.

FIG. 19 illustrates a flowchart of a method 1900 for modifying the tubular coupling 1800A, according to an embodiment. As explained in greater detail below, the tubular coupling 1800A may be modified to extend the life the tubular coupling 1800A so that the tubular coupling 1800A may be reused one or more times. The method 1900 may be viewed together with FIGS. 18A-D. It will be appreciated that the method 1900 may apply to any of the tubular couplings and any of the thread configurations described herein.

The method 1900 may include re-forming the threads 1812A, 1812B in the two connectors 1802A, 1802B, as at 1902. Re-forming the threads 1812A, 1812B may include inserting a tool into the bore defined by the connectors 1802A, 1802B and cutting, machining, etc. the inner radial surfaces of the connectors 1802A, 1802B with the tool, which may remove or smooth over any deformation of the threads 1812A, 1812B. In at least one embodiment, the tool used to re-form the threads may be the same tool that was used to initially form the threads 1812A, 1812B.

The method 1900 may also include forming first new threads 1814A, 1814B as an extension/continuation of the threads 1812A, 1812B, as at 1904. This is shown in FIG. 18B. Thus, the first new threads 1814A, 1814B may have the same shape (e.g., thread height, pitch, etc.) as the threads 1812A, 1812B. In some embodiments, the threads 1814A, 1814B may be formed as or similar to any of the thread shapes disclosed herein and/or others, whether or not the same as the threads 1812A, 1812B. The shape of the threads 1812A, 1812B and the first new threads 1814A, 1814B may be the same as any of the threads disclosed in previous embodiments of this application. Forming the first new threads 1814A, 1814B may include pushing the tool into the bore until the tool contacts the shoulder 1822. The tool may then remove a portion of the shoulder 1822 (e.g., by cutting, machining, etc. the shoulder 1822), thereby reducing the length 1834A of the shoulder 1822. This may cause the shoulder 1822 to have a second length 1834B that is less than the first length 1834A. For example, the length 1834B may be from about 3 inches to about 6 inches (e.g., about 4.382 inches).

In at least one embodiment, the tool may cut, machine, etc. the first new threads 1814A, 1814B in the inner radial surfaces of the connectors 1802A, 1802B simultaneously with the cutting, machining, etc. of the shoulder 1822 to reduce the length 1834A of the shoulder 1822. In another embodiment, the tool may be removed after cutting, machining, etc. the shoulder 1822 to reduce the length 1834A of the shoulder 1822, and a second tool may be inserted into the bore to cut, machine, etc. the first new threads 1814A, 1814B in the inner radial surfaces of the connectors 1802A, 1802B.

In embodiments in which the radial thickness 1836 of the connectors 1802A, 1802B decreases proceeding away from the shoulder 19822, re-forming the threads 1812A, 1812B and/or forming the first new threads 1814A, 1814B may reduce the wall thickness 1836 of the connectors 1802A, 1802B. This may decrease the structural integrity of the connectors 1802A, 1802B proximate to the axial ends 1810A, 1810B thereof. Thus, the method 1900 may also include removing a portion of an axial end 1810A, 1810B of each of the connectors 1802A, 1802B, as at 1906. This may cause the tubular coupling 1800B to have a second length 1830B that is less than the first length 1830A. For example, after removal, the length 1830B may be from about 10 inches to about 13 inches (e.g., about 11.875 inches). After the length of the connectors 1802A, 1802B is increased (e.g., by cutting, machining, etc. the shoulder 1822 to reduce the length 1834A of the shoulder 1822) and decreased (e.g., by removing a portion of an axial end of each of the connectors 1802A, 1802B), the connectors 1802A, 1802B may have substantially the same length 1832 (e.g., within 0.5 inches) in FIG. 18B as they had in FIG. 18A. In other words, a length of the portion of the shoulder 1822 that is removed may be substantially equivalent (e.g., within 0.5 inches) to an aggregate of the lengths of the portions of the axial ends 1810A, 1810B) of the body 1804 that are removed.

Blocks 1902, 1904, 1906 may occur in any order. In one example, the threads 1812A, 1812B may be re-formed, and then the first new threads 1814A, 1814B may be formed, and then the portion of the axial end 1810A, 1810B of each of the connectors 1802A, 1802B may be removed. In another example, the threads 1812A, 1812B may be re-formed simultaneously with the first new threads 1814A, 1814B being formed, and then the portion of the axial end 1810A, 1810B of each of the connectors 1802A, 1802B may be removed. In yet another example, the portion of the axial end 1810A, 1810B of each of the connectors 1802A, 1802B may be removed prior to re-forming the threads 1812A, 1812B and the forming of the first new threads 1814A, 1814B. In at least one embodiment, new inboard and/or outboard circumferential grooves may be formed in the body 1804 for receiving sealing elements (e.g., as described above with respect to FIGS. 16 and 17). This may take place before, simultaneously with, or after any of blocks 1902, 1904, or 1906.

The method 1900 may also include connecting a first tubular and a second tubular together via the tubular coupling 1800B, as at 1908. This may be, for example, the second time that the tubular coupling 1800B is used. As mentioned above, this use of the tubular coupling 1800B may cause the tubular coupling 1800B to be damaged and potentially unsuitable for subsequent use. For example, the threads 1812A, 1812B, 1814A, 1814B may deform during use. When this occurs, the following blocks 1910, 1912, 1914 may modify the tubular coupling 1800B (in FIG. 18B) to produce the tubular coupling 1800C (in FIG. 18C), which may be suitable for subsequent use.

More particularly, the method 1900 may include re-forming the threads 1812A, 1812B, 1814A, 1814B in the two connectors 1802A, 1802B, as at 1910. The method 1900 may also include forming second new threads 1816A, 1816B as an extension/continuation of the first new threads 1814A, 1814B, as at 1912. This is shown in FIG. 18C. This may cause the shoulder 1822 to have a third length 1834C that is less than the second length 1834B. For example, the length 1834C may be from about 2 inches to about 3 inches (e.g., about 2.632 inches).

The method 1900 may also include removing a portion of the axial end 1810A, 1810B of each of the connectors 1802A, 1802B, as at 1914. This may cause the tubular coupling 1800C to have a third length 1830C that is less than the second length 1830B. For example, after removal, the length 1830C may be from about 9 inches to about 11 inches (e.g., about 10.125 inches). After the length of the connectors 1802A, 1802B is increased (e.g., by cutting, machining, etc. the shoulder 1822 to reduce the length 1834B of the shoulder 1822) and decreased (e.g., by removing a portion of an axial end of each of the connectors 1802A, 1802B), the connectors 1802A, 1802B may have the same length 1832 in FIG. 18C as they had in FIG. 18B.

The method 1900 may also include connecting a third tubular and a fourth tubular together via the tubular coupling 1800C, as at 1916. This may be, for example, the third time that the tubular coupling 1800C is used. As mentioned above, this use of the tubular coupling 1800C may cause the tubular coupling 1800C to be damaged and potentially unsuitable for subsequent use. For example, the threads 1812A, 1812B, 1814A, 1814B, 1816A, 1816B may deform during use. When this occurs, the following blocks 1918, 1920, 1922 may modify the tubular coupling 1800C (in FIG. 18C) to produce the tubular coupling 1800D (in FIG. 18D), which may be suitable for subsequent use.

More particularly, the method 1900 may also include re-forming the threads 1812A, 1812B, 1814A, 1814B, 1816A, 1816B in the two connectors 1802A, 1802B, as at 1918. The method 1900 may also include forming third new threads 1818A, 1818B as an extension/continuation of the second new threads 1816A, 1916B, as at 1920. This is shown in FIG. 18D. This may cause the shoulder 1822 to have a fourth length 1834D that is less than the third length 1834C. For example, the length 1834D may be from about 0.5 inches to about 1.5 inches (e.g., about 0.882 inches).

The method 1900 may also include removing a portion of the axial end 1810A, 1810B of each of the connectors 1802A, 1802B, as at 1922. This may cause the tubular coupling 1800D to have a fourth length 1830D that is less than the third length 1830C. For example, after removal, the length 1830D may be from about 7 inches to about 10 inches (e.g., about 8.375 inches). After the length of the connectors 1802A, 1802B is increased (e.g., by cutting, machining, etc. the shoulder 1822 to reduce the length 1834C of the shoulder 1822) and decreased (e.g., by removing a portion of an axial end of each of the connectors 1802A, 1802B), the connectors 1802A, 1802B may have the same length 1832 in FIG. 18D as they had in FIG. 18C.

The method 1900 may also include connecting a fifth tubular and a sixth tubular together via the tubular coupling 1800D, as at 1924. This may be, for example, the fourth time that the tubular coupling 1800D is used. As mentioned above, this use of the tubular coupling 1800D may cause the tubular coupling 1800D to be damaged and potentially unsuitable for subsequent use. For example, the threads 1812A, 1812B, 1814A, 1814B, 1816A, 1816B, 1818A, 1818B may deform during use. The method 1900 may conclude when the length 1834D of the shoulder 1822 is not long enough for another round of modifications (e.g., as at blocks 1904, 1912, 1920).

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for modifying a tubular coupling, comprising:
    providing a tubular coupling comprising:
        a body having a bore formed axially-therethrough;
        internal threads formed on an inner surface of the body that were used to couple the tubular coupling to a tubular member; and
        a shoulder extending radially-inward from body with respect to the internal threads;
    forming new threads in the tubular coupling after the tubular coupling has been coupled to the tubular member and decoupled from the tubular member, wherein the new threads are a continuation of the internal threads, and wherein forming the new threads comprises removing a portion of the shoulder; and
    removing a portion of an axial end of the body, such that a length of the body is reduced.

2. The method of claim 1, wherein forming the new threads comprises re-forming at least a portion of the internal threads after the tubular coupling has been coupled to the tubular member and then decoupled from the tubular member.

3. The method of claim 1, wherein removing the portion of the axial end comprises removing the portion of the axial end after the new threads are formed.

4. The method of claim 1, wherein removing the portion of the axial end comprises removing the portion of the axial end before the new threads are formed.

5. The method of claim 1, wherein removing the portion of the shoulder comprises removing a length of the portion of the shoulder that is substantially equivalent to a length of the portion of the axial end of the body that is removed.

6. The method of claim 1, wherein a radial thickness of the body decreases proceeding toward the axial end of the body.

7. The method of claim 1, wherein the new threads have a ratio of thread height to pitch of between 0.10 and 0.20, and wherein the new threads have at least one kick-out feature including at least one rounded or chamfered corner thereof.

8. A method for modifying a tubular coupling, comprising:
decoupling the tubular coupling from a first tubular member and from a second tubular member, wherein the tubular coupling comprises:
a body having a first axial side and a second axial side;
a first connector having first internal threads that are configured to couple with the first tubular member, the first connector extending from the first axial side, the first connector defining a radially-facing sealing surface;
a second connector having second internal threads that are configured to couple with the second tubular member, the second connector extending from the second axial side, the second connector defining a radially-facing sealing surface, and the first and second connectors being in fluid communication with one another through the body when the tubular coupling is coupled to the first tubular member and the second tubular member; and
a shoulder positioned axially-between the first and second connectors;
forming new threads in the tubular coupling after the tubular coupling has been decoupled from the first and second tubular members, wherein forming the new threads comprises removing a portion of the shoulder, and wherein the first internal threads and the new threads have a ratio of thread height to pitch of between 0.10 and 0.20; and
removing a portion of the first axial side of the body and a portion of the second axial side of the body after decoupling the tubular coupling from the first tubular member and the second tubular member.

9. The method of claim 8, wherein forming comprises re-forming the first and second internal threads after the tubular coupling has been decoupled from the first and second tubular members.

10. The method of claim 8, wherein removing the portion of the first axial side and the portion of the second axial side comprises removing the portion of the first axial side and the portion of the second axial side after the new threads are formed.

11. The method of claim 8, wherein removing the portion of the first axial side and the portion of the second axial side comprises removing the portion of the first axial side and the portion of the second axial side before the new threads are formed.

12. The method of claim 8, wherein removing the portion of the shoulder comprises removing a length of the shoulder that is substantially equivalent to an aggregate of a length of the portion of the first axial side and a length of the portion of the second axial side.

13. The method of claim 8, wherein a radial thickness of the body decreases proceeding from the shoulder toward the first and second axial sides.

14. The method of claim 8, wherein the new threads are a continuation of the first internal threads, the second internal threads, or both.

* * * * *